(12) United States Patent
Moses et al.

(10) Patent No.: US 11,600,264 B2
(45) Date of Patent: Mar. 7, 2023

(54) EXTRACTING CONTENT FROM SPEECH PROSODY

(71) Applicant: YEDA RESEARCH AND DEVELOPMENT CO. LTD., Rehovot (IL)

(72) Inventors: Elisha Moses, Rehovot (IL); Tirza Biron, Rehovot (IL); Dominik Freche, Rehovot (IL); Daniel Baum, Rehovot (IL); Nadav Matalon, Rehovot (IL); Netanel Ehrmann, Rehovot (IL); Eyal Weinreb, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 0 days.

(21) Appl. No.: 16/767,110

(22) PCT Filed: Nov. 26, 2018

(86) PCT No.: PCT/IL2018/051282
§ 371 (c)(1),
(2) Date: May 26, 2020

(87) PCT Pub. No.: WO2019/102477
PCT Pub. Date: May 31, 2019

(65) Prior Publication Data
US 2020/0380960 A1  Dec. 3, 2020

Related U.S. Application Data

(60) Provisional application No. 62/626,116, filed on Feb. 4, 2018.

(30) Foreign Application Priority Data

Nov. 27, 2017 (IL) .......................................... 255954

(51) Int. Cl.
G10L 15/22 (2006.01)
G10L 15/18 (2013.01)
(Continued)

(52) U.S. Cl.
CPC .......... *G10L 15/1807* (2013.01); *G10L 15/02* (2013.01); *G10L 15/05* (2013.01); *G10L 2015/025* (2013.01)

(58) Field of Classification Search
CPC ... G10L 15/22; G10L 15/02; G10L 2015/025; G10L 15/05; G10L 15/063; G10L 15/178;
(Continued)

(56) References Cited

U.S. PATENT DOCUMENTS 7,286,987 B2 * 10/2007 Roy ........................ G10L 15/08
704/270
2002/0010575 A1 1/2002 Haase et al.
(Continued)

FOREIGN PATENT DOCUMENTS

EP  1927979 A1  6/2008
EP  2899722 A1  7/2015
(Continued)

OTHER PUBLICATIONS

Chafe W. "Cognitive constraints on information flow. Coherence and grounding in discourse" ed. by Russell Tomlin, 21-51. Amsterdam & Philadelphia: John Benjamins. 1987.
(Continued)

*Primary Examiner* — Jakieda R Jackson
(74) *Attorney, Agent, or Firm* — Mark S. Cohen; Pearl Cohen Zedek Latzer Baratz LLP

(57) ABSTRACT

A prosodic speech recognition engine configured to identify prosodic features and patterns in a speech continuum for the
(Continued)

extraction of linguistic content including para-syntactic content, discourse function, information structure, meaning, and speaker sentiment.

20 Claims, 18 Drawing Sheets

(51) Int. Cl.
    *G10L 15/02*     (2006.01)
    *G10L 15/05*     (2013.01)

(58) Field of Classification Search
    CPC .................. G10L 25/30; G10L 15/1807; G10L 2025/906; G10L 25/90; G06F 3/167; G06F 40/30
    See application file for complete search history.

(56) References Cited

U.S. PATENT DOCUMENTS

| | | |
|---|---|---|
| 2010/0174533 A1 | 7/2010 | Pakhomov |
| 2012/0245942 A1 | 9/2012 | Zechner et al. |
| 2017/0309271 A1 | 10/2017 | Chiang |

FOREIGN PATENT DOCUMENTS

| | | |
|---|---|---|
| ER | 1635327 A1 | 3/2006 |
| WO | WO 2006/104988 A1 | 10/2006 |
| WO | WO 2008/033095 A1 | 3/2008 |

OTHER PUBLICATIONS

Du Bois et al. "Discourse transcription: Santa Barbara papers in linguistics, vol. 4" Santa Barbara: Department of Linguistics, University of California, Santa Barbara. 1992.

Du Bois et a. "Santa barbara corpus of spoken american english" CD-ROM. Philadelphia: Linguistic Data Consortium. 2000.

Garellek M. "Perception of glottalization and phrase-final creak" The Journal of the Acoustical Society of America. Feb. 2015; 137(2):822-31.

International Search Report for PCT Application No. PCT/IL2018/051282 dated Mar. 27, 2019.

Jeon, J. H., & Liu, Y. (2012). Automatic prosodic event detection using a novel labeling and selection method in co-training. Speech Communication, 54(3), 445-458.

Kahn et al. "Effective use of prosody in parsing conversational speech" In Proceedings of the conference on human language technology and empirical methods in natural language processing Oct. 6, 2005 (pp. 233-240). Association for Computational Linguistics.

Lieske et al. "Giving prosody a meaning" In Fifth European Conference on Speech Communication and Technology 1997.

Liu et al. "Enriching speech recognition with automatic detection of sentence boundaries and disfluencies" IEEE Transactions on audio, speech, and language processing. Aug. 21, 2006;14(5):1526-40.

Ludusan et al. "Towards low-resource prosodic boundary detection" In Spoken Language Technologies for Under-Resourced Languages 2014.

Ludusan et al. "Prosodic boundary information helps unsupervised word segmentation" In Proceedings of the 2015 Conference of the North American Chapter of the Association for Computational Linguistics: Human Language Technologies 2015 (pp. 953-963).

Mairesse et al. "Can prosody inform sentiment analysis? experiments on short spoken reviews" In 2012 IEEE International Conference on Acoustics, Speech and Signal Processing (ICASSP) Mar. 25, 2012 (pp. 5093-5096). IEEE.

Noth el al. "Verbmobil: The use of prosody in the linguistic components of a speech understanding system" IEEE Transactions on Speech and Audio processing. Sep. 2000;8(5):519-32.

Rosenberg A. "Automatic detection and classification of prosodic events" Columbia University; 2009.

Rousseau et al. "TED-LIUM: an Automatic Speech Recognition dedicated corpus" In LREC May 1, 2012 (pp. 125-129).

Shriberg et al. "Prosody-based automatic segmentation of speech into sentences and topics" Speech communication. Sep. 1, 2000;32(1-2):127-54.

Shriberg et al. "Direct modeling of prosody: An overview of applications in automatic speech processing" In Speech Prosody 2004, International Conference 2004.

Tamburini et al. "An automatic system for detecting prosodic prominence in American English continuous speech" International Journal of speech technology. Jan. 1, 2005:8(1):33-44.

Wightman et al. "Automatic recognition of prosodic phrases" In [Proceedings] ICASSP 91: 1991 International Conference on Acoustics, Speech, and Signal Processing Apr. 14, 1991 (pp. 321-324). IEEE.

\* cited by examiner

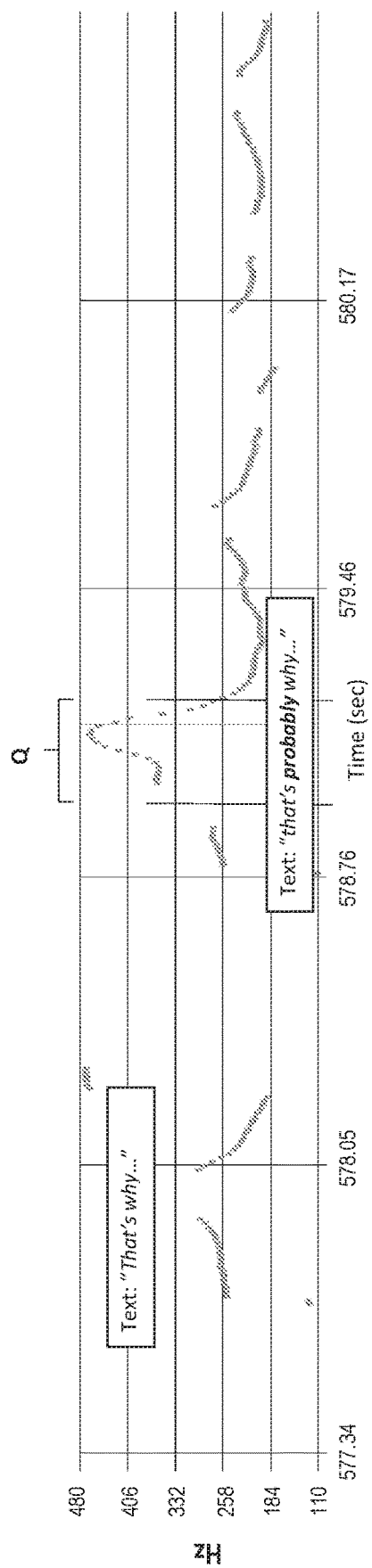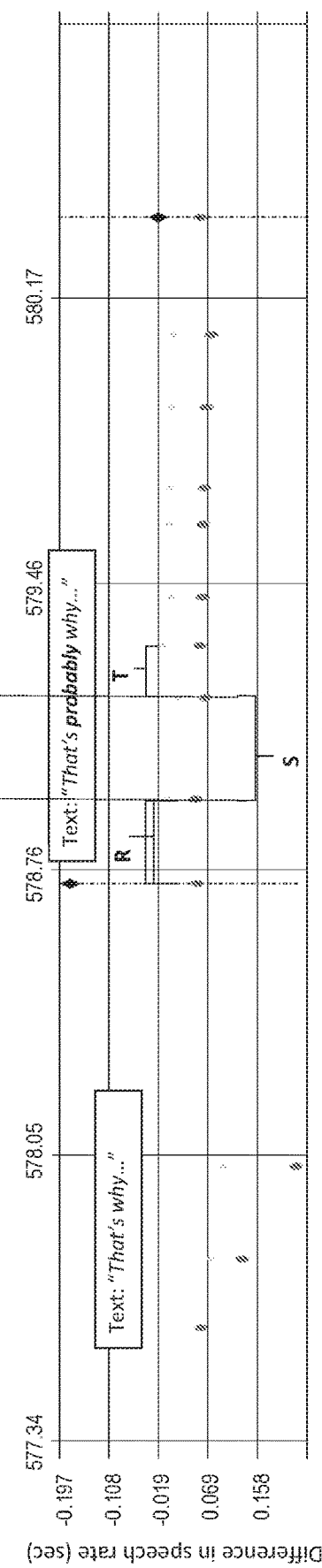

EXTRACTING CONTENT FROM SPEECH PROSODY

BACKGROUND OF THE INVENTION

Although computerized speech recognition has advanced significantly in recent years, there is considerable linguistic content that remains inaccessible to conventional speech recognition systems. These additional layers of information are prosodic-linguistic patterns embedded in acoustic features that can be extracted.

Identification of prosody-based content is not well-known and, accordingly, has not yet been implemented autonomously in speech recognition engines. Therefore, there is a need for an autonomous speech recognition engine capable of extracting linguistic content from prosodic features encoded in speech.

SUMMARY OF THE INVENTION

According to the teachings of the present invention there is provided a method for extracting prosodic content from a speech continuum, performed on a computing device having a processor, memory, and one or more code sets stored in the memory and executed in the processor, a microphone, and output device, the method including: capturing a snippet of a speech continuum; calculating word-specific speech rates of words within the snippet, each of the word-specific speech rates being an average phoneme rate of phonemes within words; receiving a reference speech rate; calculating speech rate deviations between the word-specific speech rates and the reference speech rate for the words; identifying at least two words characterized by a threshold speech rate deviation; and denoting each of the at least two words characterized by the threshold speech rate deviation as a boundary of each of the intonation segments.

According to a further feature of the present invention, the reference speech rate is implemented as speaker-specific, average speech rate across the snippet.

According to a further feature of the present invention, the reference speech rate is implemented as the speech rate of the previous word.

According to a further feature of the present invention, there is also provided calculating an average speech rate deviation for intra-segment word-strings of the intonation segments; calculating an average word-delivery-speed for the intra-segment word-strings of the intonation segments; identifying a word string characterized by both a minimum intra-segment speech-rate deviation and a maximum, average word-delivery-speed, the word string embodying a departure from discourse flow; and denoting the word string characterized by both a minimum intra-segment speech-rate deviation and a maximum, average word-delivery-speed as a departure from discourse flow.

According to a further feature of the present invention, there is also provided identifying a minimum pitch of intra-segment word-strings; identifying a maximum pitch of the intra-segment word-strings; calculating a pitch ratio of the maximum pitch to the minimum pitch; comparing the pitch ratio to a gender-specific threshold ratio associated with an inquiry; identifying one or more words characterized by a pitch ratio exceeding the threshold ratio; and denoting the word string having a pitch ratio exceeding the threshold ratio as an inquiry.

According to a further feature of the present invention, the threshold ratio is between 1.7-2.1 wherein the inquiry is an ascertainment question.

According to a further feature of the present invention, the threshold ratio is between 1.3-1.7, wherein the inquiry is a polar question.

According to a further feature of the present invention, the threshold ratio is between 1.1-1.5, wherein the inquiry is up-speak.

According to a further feature of the present invention, there is also provided calculating average word-delivery-speeds for intra-segment word-strings of the intonation segments; identifying an intra-segment word-string having a pitch peak; identifying a word-string characterized by both a minimum, average word-delivery-speed and a pitch peak, the word-string characterized by both a minimum, average word-delivery-speed embodying heightened informativity; and denoting the word-string characterized by both a minimum, average word-delivery-speed as an expression of heightened informativity.

According to a further feature of the present invention, there is also provided identifying an intra-segment word-string having an intensity fluctuation between 48 Hz to 54 Hz; and denoting the word-string having an intensity fluctuation between 48 Hz to 54 Hz as an expression of speaker reservation.

There is also provided according to the teachings of the present invention, a prosodic speech recognition engine including; a microphone; an output device; and a computer configured to: capture a snippet of a speech continuum through the microphone; calculate word-specific speech rates of words within the snippet, each of the word-specific speech rates being an average phoneme rate of phonemes within words; receive a reference speech rate; calculate speech rate deviations between the word-specific speech rates and the reference speech rate for the words; identify at least two words characterized by a threshold speech rate deviation; and denote through the output device each of the at least two words characterized by the threshold speech rate deviation as a boundary of at least two intonation segments.

According to a further feature of the present invention, the reference speech rate is implemented as speaker-specific, average speech rate across the snippet.

According to a further feature of the present invention, the reference speech rate is implemented as the speech rate of the previous word.

According to a further feature of the present invention, the computer is further configured to: calculate an average speech rate deviation for intra-segment word-strings of the intonation segments; calculate an average word-delivery-speed for the intra-segment word-strings of the intonation segments; identify a word string characterized by both a minimum intra-segment speech-rate deviation and a maximum, average word-delivery-speed; and denote the word string characterized by both a minimum intra-segment speech-rate deviation and a maximum, average word-delivery-speed as a departure from discourse flow.

According to a further feature of the present invention, the computer is further configured to: identify a minimum pitch of intra-segment word-strings; identify a maximum pitch of the intra-segment word-strings; calculate a pitch ratio of the maximum pitch to the minimum pitch; compare the pitch ratio to a gender-specific threshold ratio associated with an inquiry; identify word string having a pitch ratio exceeding the threshold ratio; and denote the word string having a pitch ratio exceeding the threshold ratio as an inquiry.

According to a further feature of the present invention, the threshold ratio is between 1.7-2.1, wherein the inquiry is an ascertainment question.

According to a further feature of the present invention, the threshold ratio is between 1.3-1.7, wherein the inquiry is a polar question.

According to a further feature of the present invention, the threshold ratio is between 1.1-1.5, wherein the inquiry is up-speak.

According to a further feature of the present invention, the computer is further configured to: calculate average word-delivery-speeds for intra-segment word-strings of the intonation segments; identify an intra-segment word-string having pitch peak; identify a word-string characterized by both a minimum, average word-delivery-speed and a pitch peak the word-string characterized by both a minimum, average word-delivery-speed embodying heightened informativity; and denote the word-string characterized by both a minimum, average word-delivery-speed as an expression of heightened informativity.

According to a further feature of the present invention, the computer is further configured to: identify an intra-segment word-string having an intensity fluctuation between 48-54 Hz; and denote the word-string having an intensity fluctuation between 48 Hz to 54 Hz as an expression of speaker reservation.

According to a further feature of the present invention, the computer is further configured to tag the word string having a pitch ratio having a threshold ratio of 1.7-2.1 as a first order prosodic feature.

According to a further feature of the present invention, the computer is further configured to tag the word string having a pitch ratio having a threshold ratio of 1.1-1.5 as a second order prosodic feature.

According to a further feature of the present invention, the computer is further configured to tag the word-string characterized by both a minimum, average word-delivery-speed and a pitch peak as a third order prosodic feature.

According to a further feature of the present invention, the computer is further configured to tag the intra-segment word-string having an intensity fluctuation between 48-54 Hz as a fourth order prosodic feature.

According to a further feature of the present invention, the computer is further configured to employ peak intensity-pitch values so as to identify heightened informativity.

BRIEF DESCRIPTION OF THE DRAWINGS

The subject matter regarded as the invention is particularly pointed out and distinctly claimed in the concluding portion of the specification. The invention, its method of operation, features, and advantages are best understood with reference to the accompanying drawings in which:

FIGS. 9A-9B are plots of both pitch and speech rate as a function of time, respectively, for identifying heightened informativity, according to an embodiment;

Figure 1:
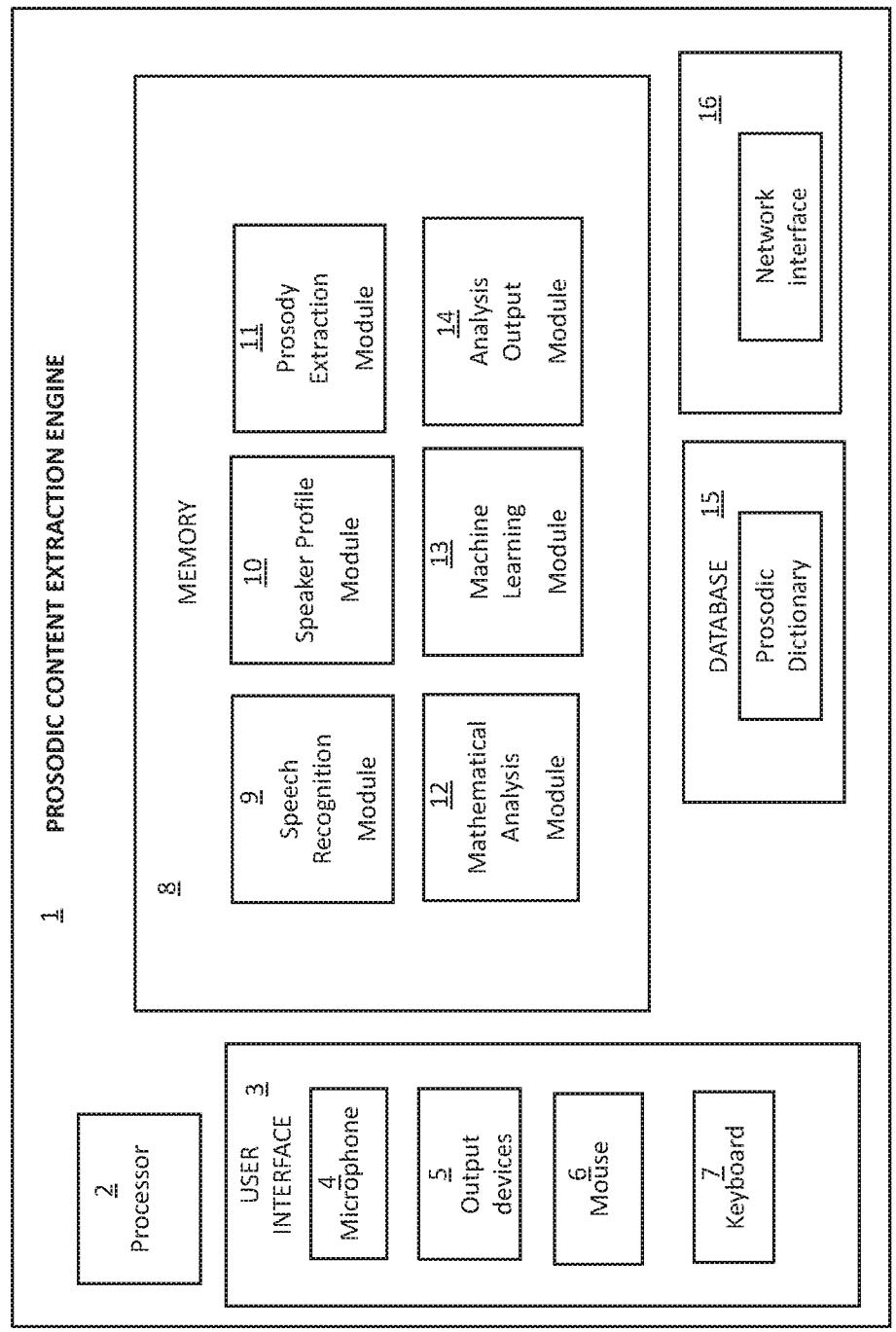
FIG. 1 is a block diagram of an autonomous, prosodic speech-recognition engine, according to an embodiment.

It will be appreciated that for the sake of clarity, figure elements are not necessarily drawn to scale and reference numerals may be repeated among figures for identical or analogous elements.

DETAILED DESCRIPTION

In the following description, numerous details are set forth to facilitate a thorough understanding of the invention. However, it will be appreciated by those skilled in the art that the present invention may be practiced without these specific details. Furthermore, well-known methods, procedures, and components have not been omitted to more clearly highlight the inventive steps and features.

An embodiment of the present invention is a non-conventional autonomous speech recognition engine configured to extract linguistic content from a speech continuum through prosodic pattern recognition methods.

Prosodic expression in speech refers to the conveyance through the music of verbal expression in contrast to the conveyance through articulation of words.

Prosodic expression segments speech into meaningful units, and signals syntax, discourse function, information structure, interactional functions, sentiments, general attitudes, socio-linguistic information, and gender.

Syntax includes speech units such as sentences, clauses, phrases, or portions of these units. These speech units can serve a para-syntactic function, such as that of a prototypical question, a prototypical assertion, a prototypical command, a prototypical non-conclusion usually transcribed as a comma, or a prototypical circumstantial clause. It should be appreciated that prosodic features signaling syntax are also associated with and are referred to as para-syntactic prosodic features for the purposes of this document.

Discourse function is the function of a speech unit within the context of a discourse. Speech units identified through para-syntactic prosodic features are then treated in relation to their hierarchy and role in discourse. Prosodic features are employed to identify a unit's discourse function, inter alia para-syntactic question type functioning as a rhetorical question; a para-syntactic prototypical assertion functioning as a beginning or an endpoint of an argument, an apodosis, a parenthetic statement, a unit that forms part of a narrative; a para-syntactic circumstantial type functioning as a protasis; a non-continuation para-syntactic type functioning as an apposition, an item in a list.

In a certain embodiment, the appositions are identified through para-syntactic prosodic features by calculating a proximity function for classification instead of employing discourse-defining prosodic features.

Information structure refers to highlighted or emphasized important information from less saliently marked information.

Interactional functions are turn-taking signals, for example.

Sentiments include, inter alia, humor, sarcasm, amazement, reluctance, displeasure tone, non-responsiveness or other expressions of emotion.

General attitudes relate to the genre of the speech act. Following are common genre examples:
  Academic lecture characterized by a single main speaker, a relatively slow speech rate, many pauses, and formal, informative tone.
  Tour guide lecture characterized by single main speaker, unvaried speech rate, and extremely varied pitch.
  Friendly conversation characterized by more than one main speaker, overlapping speech between speakers, a relatively high speech rate, and intermitting non-verbal vocalizations.
  Marketing pitch characterized by one speaker being more active, pressing, and the other passive, with few overlapping speech chunks between speakers.
  Sermon characterized by a call to action with rather slow speech and quite varied, dramatic pitch by a single speaker.
  Professional dialogue characterized by a quest for information or understanding.
  Business discussion characterized by informational, engaging multiple moderately slow-speaking participants, with hardly any overlap speech between speakers.

Socio-linguistic information about age, social status and dialect.

As previously noted, prosodic information is "coded" through supra-segmental acoustic patterns of speech. There is encoding within primary acoustic features, such as, inter alia, fundamental frequency perceived as pitch, intensity perceived as volume, phoneme duration, word rate, and voice quality. There is also encoding within secondary features, such as, inter alia, rates of change in either frequency, intensity, formants or speech rate or word rate variance.

The following definitions will be used through the document

"Intonation Unit (IU)", "intonation segment", "prosodic segment", "prosodic unit" all refer to the basic linguistic and interactional unit breaking up the continuum of speech and is therefore the foundation working-unit for identification of prosodic patterns. The IU is defined through segmentation and in a certain embodiment is a prerequisite step for identifying prosodic patterns in the speech continuum. In another embodiment, segmentation is implemented together with detection of syntactic speech units.

The IU is characterized by a segment of a speech continuum bound by two boundaries characterized by a threshold speech-rate deviation. In certain embodiments, the boundaries are further bound with either simultaneous pitch deviation or intensity fluctuation. Clearly identified intonation units are crucial in the field of prosody recognition in that they provide a basic working-unit within which syntactic and prosodic patterns are distinguishable and realized, reflecting cognitive limitations on information allotment. Intonation unit identification also enables proper automatic punctuation, facilitating disambiguation and clarity of message. The absence of clearly identified segment boundaries could prevent recognition of the prosodic functions, since such an analysis would lack the framework for defining discourse events. It is there that information structure is signaled, attitudes manifested, emotions expressed, sarcasm and irony insinuated.

Identifying IUs is therefore an essential step in an automated recognition of prosodic patterns. It should be appreciated that the IU is not just identified through pitch; but also, through other prosodic parameters as will be further discussed. Therefore, the term of the art "intonation unit" can also refer to a prosodic unit defined by non-pitch parameters, either in the absence of pitch or in conjunction with pitch.

"Speech rate" refers to a word-specific, average phoneme rate.

In a certain embodiment, vowel-based phonemes are used as the basis for speech rates instead.

"Word speed" refers to the delivery rate of distinct words.

"Informativity" or "emphasis" is a measure of perceived importance of a part of a text with respect to its other parts. It is therefore signaled as being salient to draw additional cognitive attention to the important part of the text.

"Peaks" or "spikes" are characterized by pronounced changes in a prosodic feature, such as pitch or intensity, as a function of time or some other independent variable.

Acoustic features extracted from a raw sound wave are used to either identify basic prosodic features that, in turn, are used to identify prosodic content directly or to construct a compound of prosodic features that, in turn, are used to identify prosodic content. A summary of acoustic features, basic prosodic features generated from them, compound prosodic features constructed from the basic features, and respective distinguishing prosodic features, basic and compound, are found in the table below.

| Acoustic Features Basic | ACOUSTIC AND PROSODIC FEATURE SUMMARY | | | | | |
|---|---|---|---|---|---|---|
| | Speech rate | Word Speed Delivery | | Pitch | | Intensity Threshold |
| Prosodic Features | Threshold speech rate increase | Speech Rate | Word Speed Increase | Word Speed Decrease | Pitch peak | Pitch | Intensity Fluctuation |
| Distinguishing Prosodic Features for Respective Prosodic Content below: | | | | | | | |
| Intonation Segment Boundar | Threshold Speech Rate Increase | Pause Duration | | | | | |
| Departure from Discourse Flow | | | Simultaneous Speech Rate Invariability and Word Speed Increase | | | | |
| Ascertainment question | | | | | | Associated Threshold Pitch Ratio Increase | |
| Polar question | | | | | | Associated Threshold Pitch Ratio Increase | |
| Up-Speak | | | | | | Associated Threshold Pitch Ratio Increase | |
| Heightened informativity | | | | Simultaneous Word Speed Decrease and Pitch Peak | Intensity-Pitch Product | | |
| Speaker Reservation Threshold | | | | | | | Threshold Intensity Fluctuation |
| Parenthetic Statement | | | | | | Reduced Pitch Variability | |

Turning now to the figures, FIG. 1 is schematic block diagram of a prosodic speech recognition engine 1 configured to identity linguistic content embedded in prosodic patterns of a speech continuum in addition to articulated speech. The engine includes at least one processor 2, a user interface 3 including a microphone 4 for capturing a speech continuum, output devices 5 such as display screen, printer, a mouse 6, a keyboard 7, and other user interface accessories. Engine 1 also includes a short and long-term memory 8, loaded with applications including speech recognition module 9 configured to extract words from audio, a speaker profile module 10 configured to calculate reference values for various acoustic features, a prosody extraction module 11 configured to extract prosodic data from a speech continuum, a mathematical analysis module 12 configured to identify prosodic patterns of various lengths, a machine learning module 13 configured to classify prosodic patterns according to an embodiment, a linguistic analysis module 14 configured to render linguistic analysis data into formats suitable for user level applications.

Figure 2:
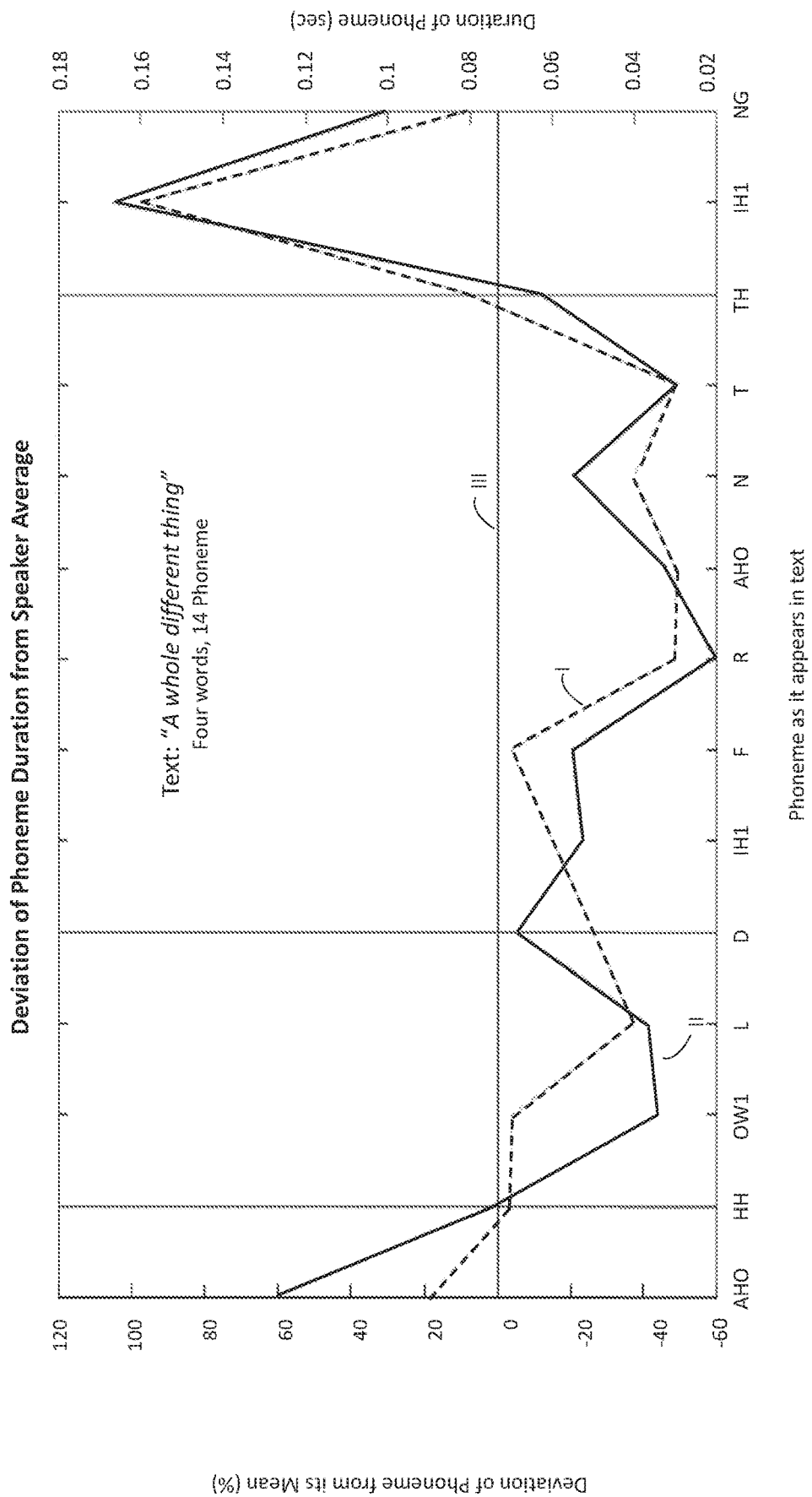
FIG. 2 are two plots of speech rate deviation as a function of time in which the deviation is measured relative to a speaker-specific, average phoneme rate or relative to a previous phoneme duration; according to embodiments.

FIG. 2 depicts two sample plots; each depicting a different method of calculating speech rate applied to a sample text of "A whole different thing" of four words and 14 phonemes.

In plot I, speech rate is calculated as a deviation from a mean phoneme duration of a speaker-specific profile as depicted in plot III. Plot II, on the other hand, depicts the absolute phone duration (sc.) of this snippet.

As shown, various phonemes are shown along the horizontal axis, mean deviation defines the left vertical axis for plot I and absolute phoneme duration defines the right vertical axis for plot III. For the purposes of this document, phoneme duration refers to the time required for its articulation and therefore the term "duration" is a measure of rate.

Figure 3:
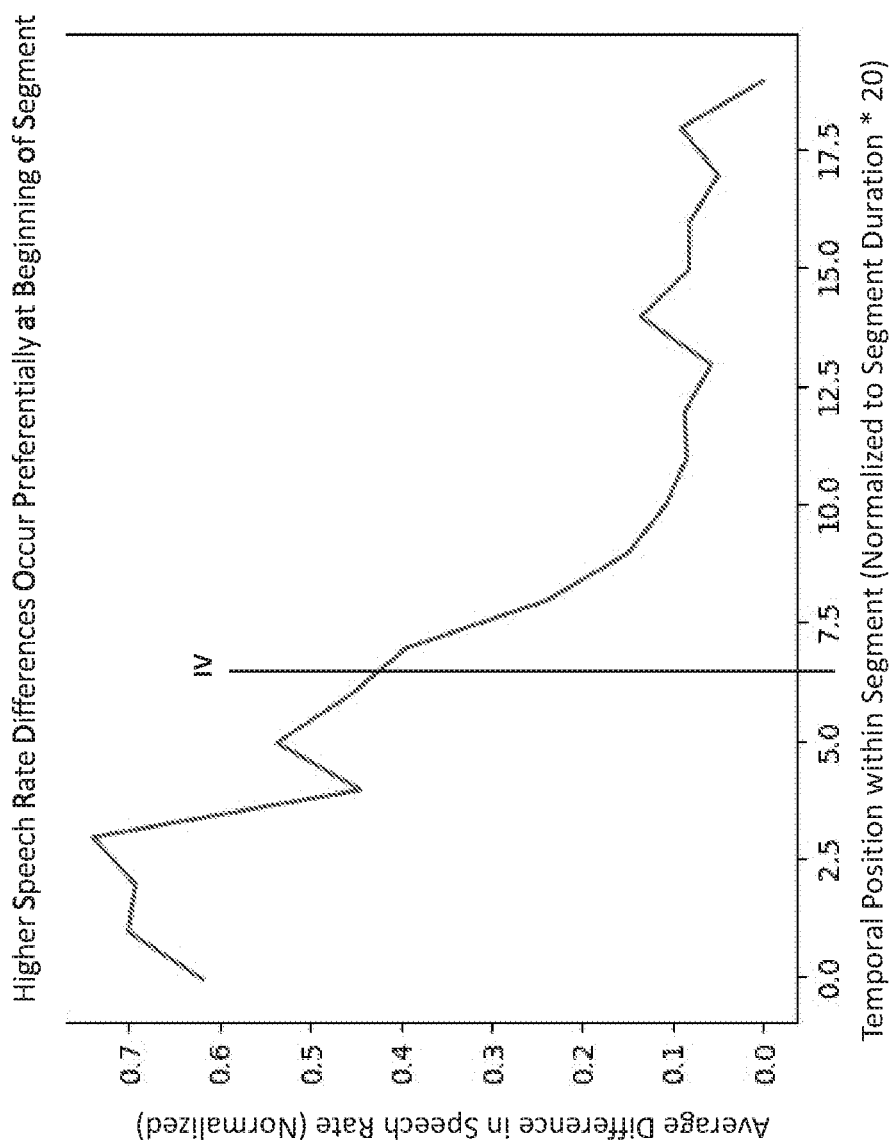
FIG. 3 is a plot of probability score as a function of change in speech rate for establishing segment boundary; according to an embodiment.

FIG. 3 is a plot of segment boundary probability as a function of speech rate. The chosen probability defines a threshold speech rate used to set a segment boundary. In the depicted embodiment, the speech rate is measured in terms of deviation of phoneme deviation from a mean phoneme duration; however, it should be appreciated that the boundary-defining change applies to both methods of calculating speech rate set forth in the context of FIG. 3. In a certain embodiment, this threshold probability is configurable to enable users to define in accordance with needs.

Figure 4A:
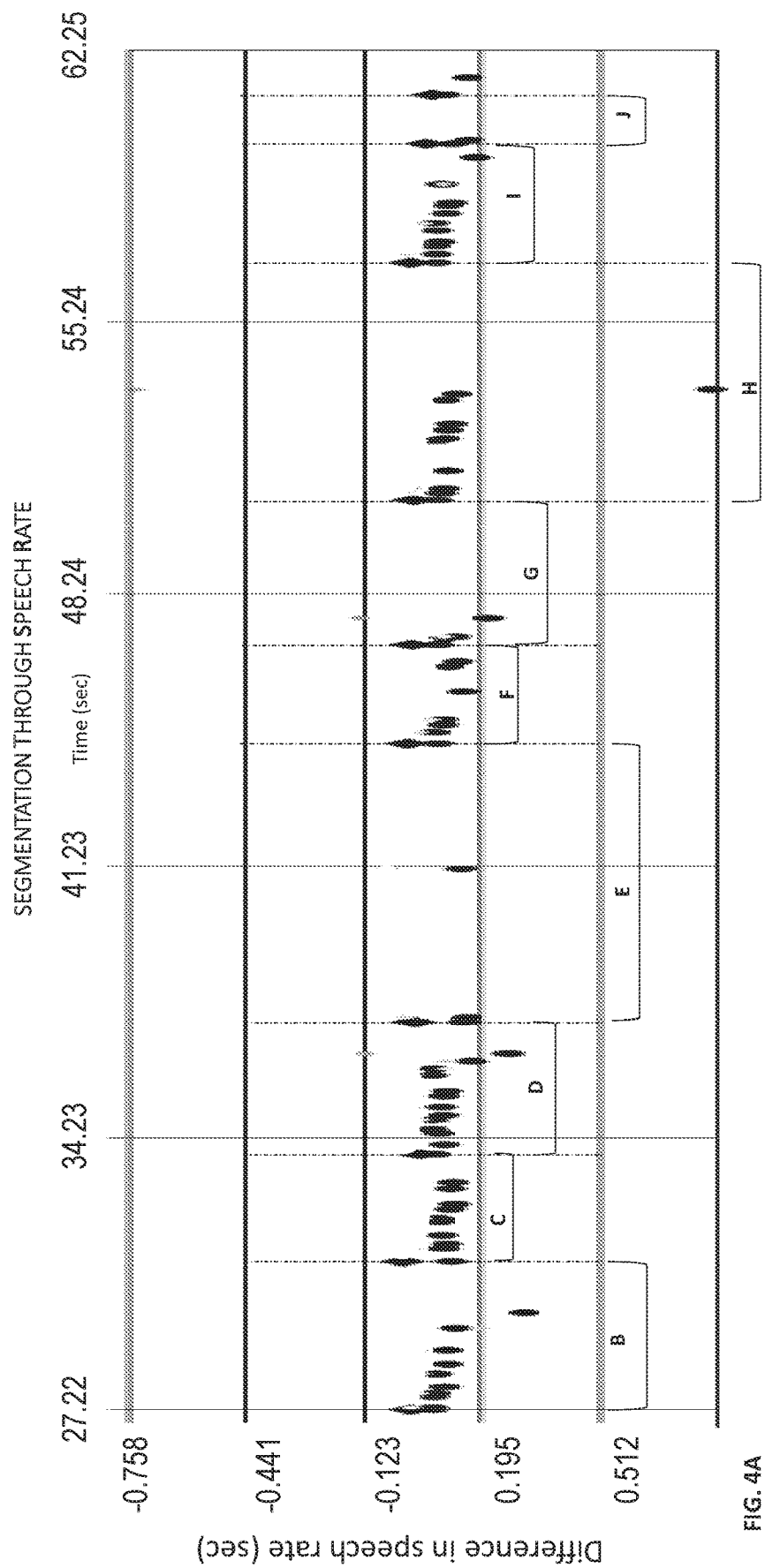
FIG. 4A is a plot of speech rate as a function of time for identifying segment boundaries in accordance with threshold speech rate deviation, according to an embodiment.

FIG. 4A is a segmentation chart depicting identified segment boundaries in accordance with deviating speech rate, according to an embodiment. As shown, each oval dot represents a word at a given speech rate and every diamond represents a statistic speech rate having threshold probability of embodying a segment boundary. For example, bracket B includes progressively slowing speech rates and the sudden increase is marked as segment boundary defining the beginning of the segment designated by bracket C. Similarly, the speech rates of segment C remain relatively constant and the point embodying a threshold change in speech rate defines as the beginning of the segment designated by bracket D. Similarly, segment E is identified by a threshold increase in speech rate and the segment continues until identification of a threshold change defining the beginning of segment F, and so too for segment G. The widely varying segment durations of segments E, F, and G illustrate the relative irrelevance of segment length in regard to defining boundaries. As shown, boundary identification for segments H, I and J all are implemented in a similar fashion.

It should be appreciated that both methods of determining speech rate noted above can be applied here too in accordance with the particular embodiment.

In another embodiment, segment boundaries are identified through the simultaneous threshold deviation in speech rate and threshold intensity change. Intensity change is measured from a baseline defined by a specific speaker median energy value.

In another embodiment of the engine, segment boundaries are identified through a threshold deviation in speech rate and a diverging rate of pitch change temporally aligned with the threshold deviation in speech rate.

In yet another embodiment of the engine, segment boundaries are identified through the threshold deviation in speech rate, intensity change and pitch rate deviation all temporally aligned.

In yet another embodiment, segment boundaries are identified through a threshold reduction in speech rate.

Figure 4B:
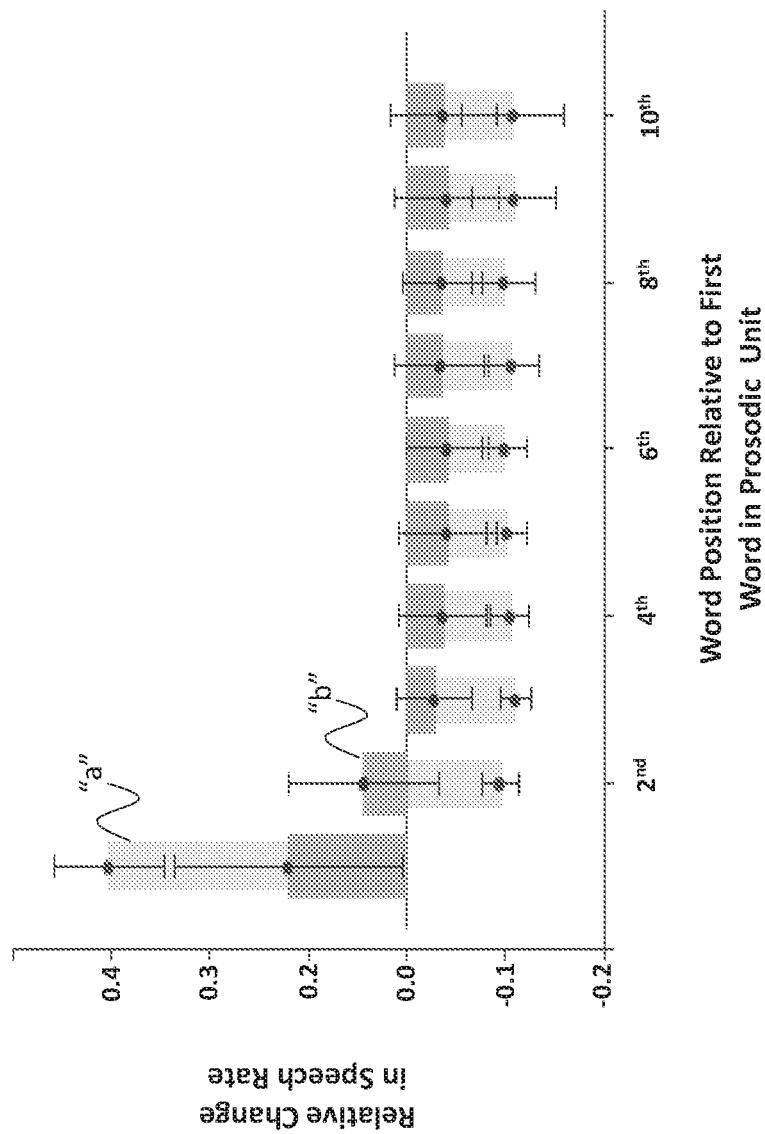
FIG. 4B depicts two bar charts of relative deviation in speech rate as a function of word position in an intonation unit highlighting the increased deviation in speech rate of the final word within the intonation unit, in both manually and machine-derived intonation units; according to an embodiment.

FIG. 4B depicts two bar charts of relative deviation in speech rate as a function of word position in an intonation unit. Bar chart "a" is generated from a machine-derived prosodic unit whereas chart "b" is generated manually. The pairing of these two charts illustrates the reliability of the speech recognition engine in that both the manual and the machine-based segmentation is defined by a pronounced changed in speech rate. As shown, the relative change in speech rate of the first word of the unit first word is significantly greater than the speech rate of the prior word completing the previous prosodic unit. Rate differences greater than 12.05%, in a certain embodiment, or genre-variable in another embodiment, are deemed to be segment defining. It should be appreciated that the segment-defining, speech deviation threshold can vary between populations and cultural communities. Accordingly, in a certain embodiment, the engine is operative in accordance thresholds supplied.

Figure 4C:
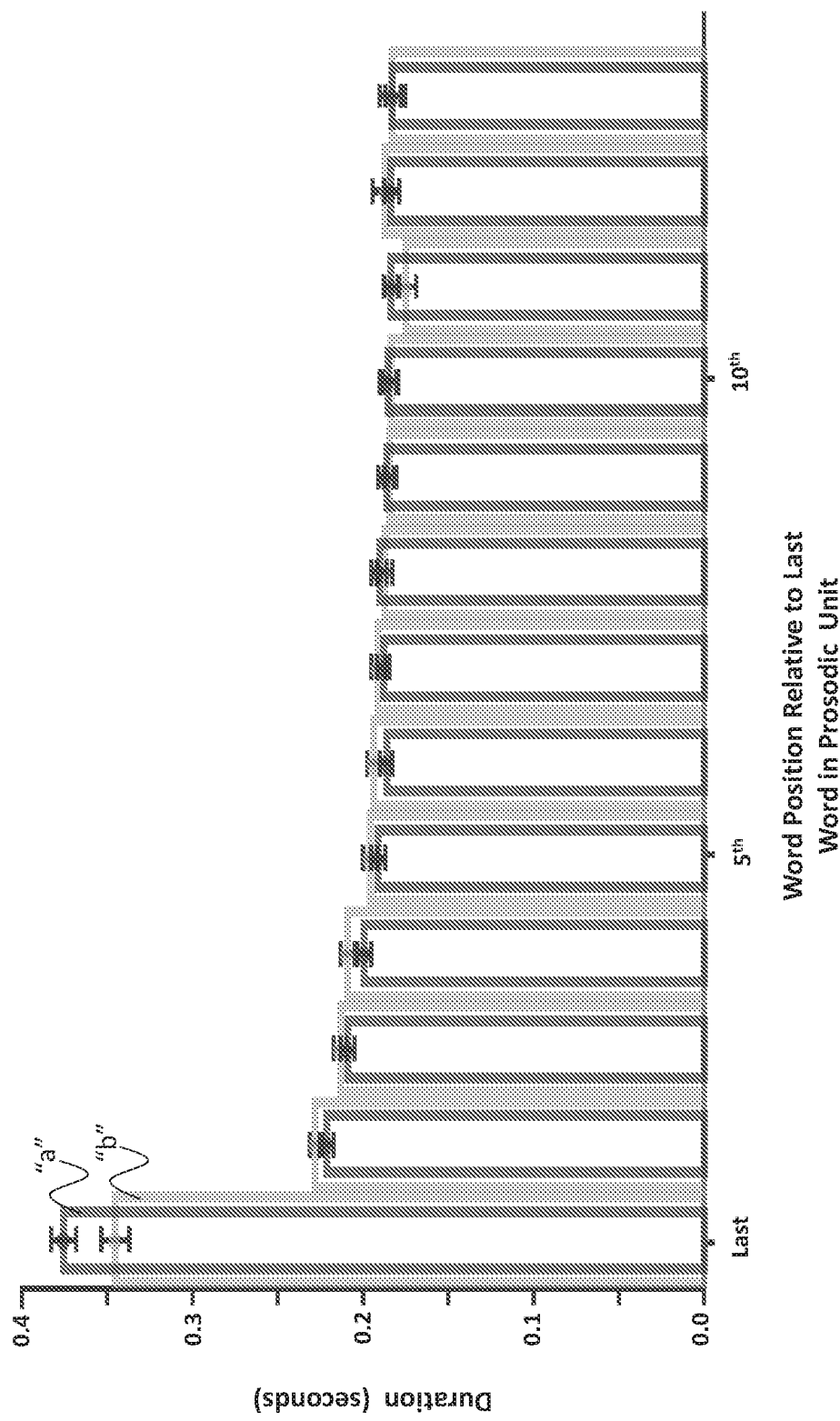
FIG. 4C depicts two bar charts of word duration as a function of word position in an intonation unit highlighting the increased word duration of the final word within the intonation unit, in both manually and machine-derived intonation units; according to an embodiment.

FIG. 4C also depicts two bar charts, machine and manually derived prosodic units, a" and "b", respectively for over 50,000 segments thereby highlighting the effectiveness of speech rate reduction as a criterion for segmentation, as previously noted.

Specifically, the word duration of the last word of the unit is significantly greater than the 200 ms duration of prior words in the prosodic unit.

Figure 4D:
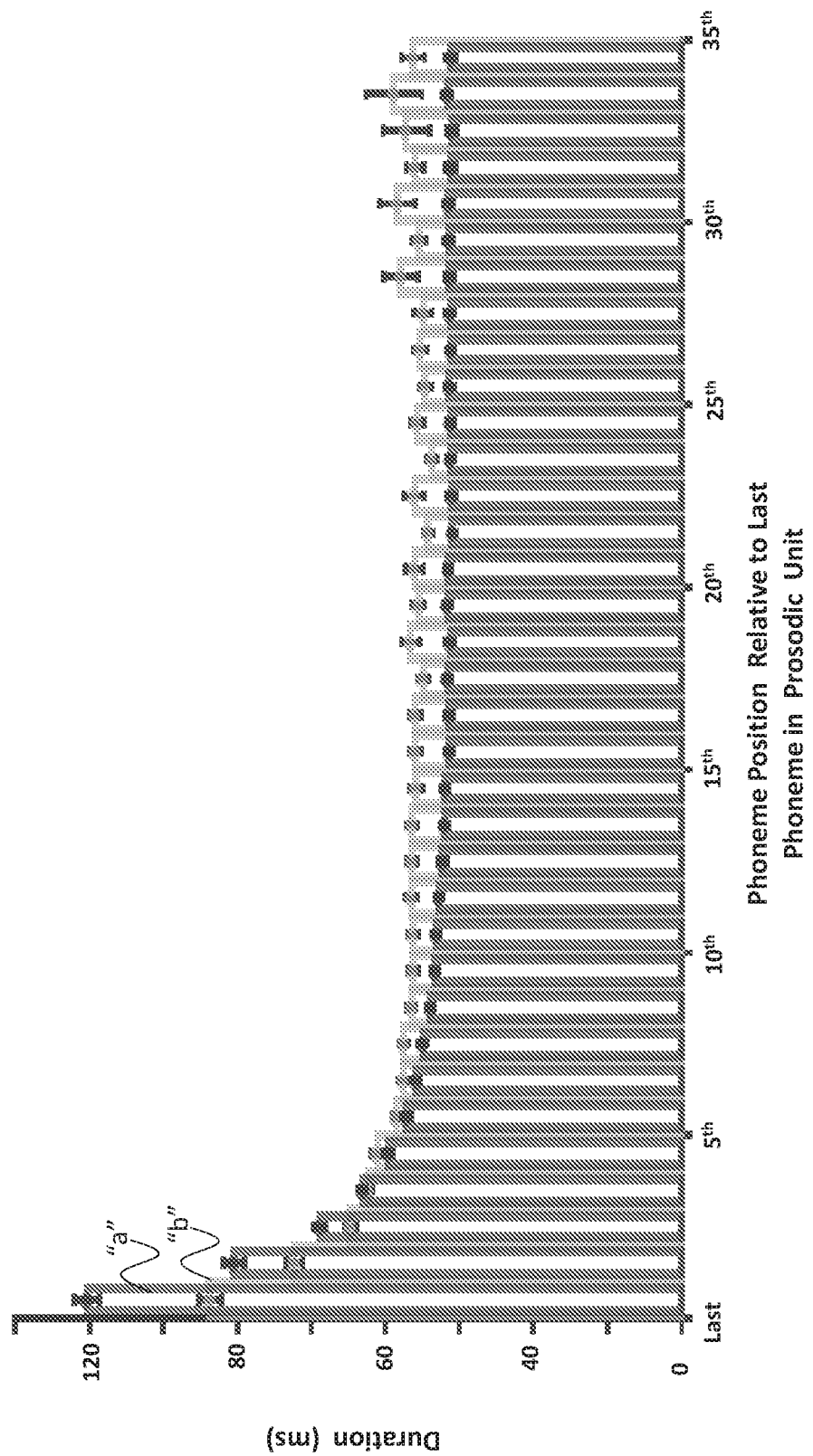
FIG. 4D depicts two bar charts of phoneme duration as a function of phoneme position in an intonation unit highlighting the increased phoneme duration of the final phoneme within the intonation unit, in both manually and machine-derived intonation units; according to an embodiment.

FIG. 4D also depicts two bar charts, "a" and "b" of phoneme duration as a function of phoneme position in the prosodic unit relative to the last phoneme of the unit.

As shown, the phoneme duration of the last phoneme of the unit is significantly greater than the duration of prior phoneme of the prosodic unit. Deviations in phoneme duration between 10-20%, in a certain embodiment, or 10-15% are employed to identify prosodic unit boundaries.

Figure 5:
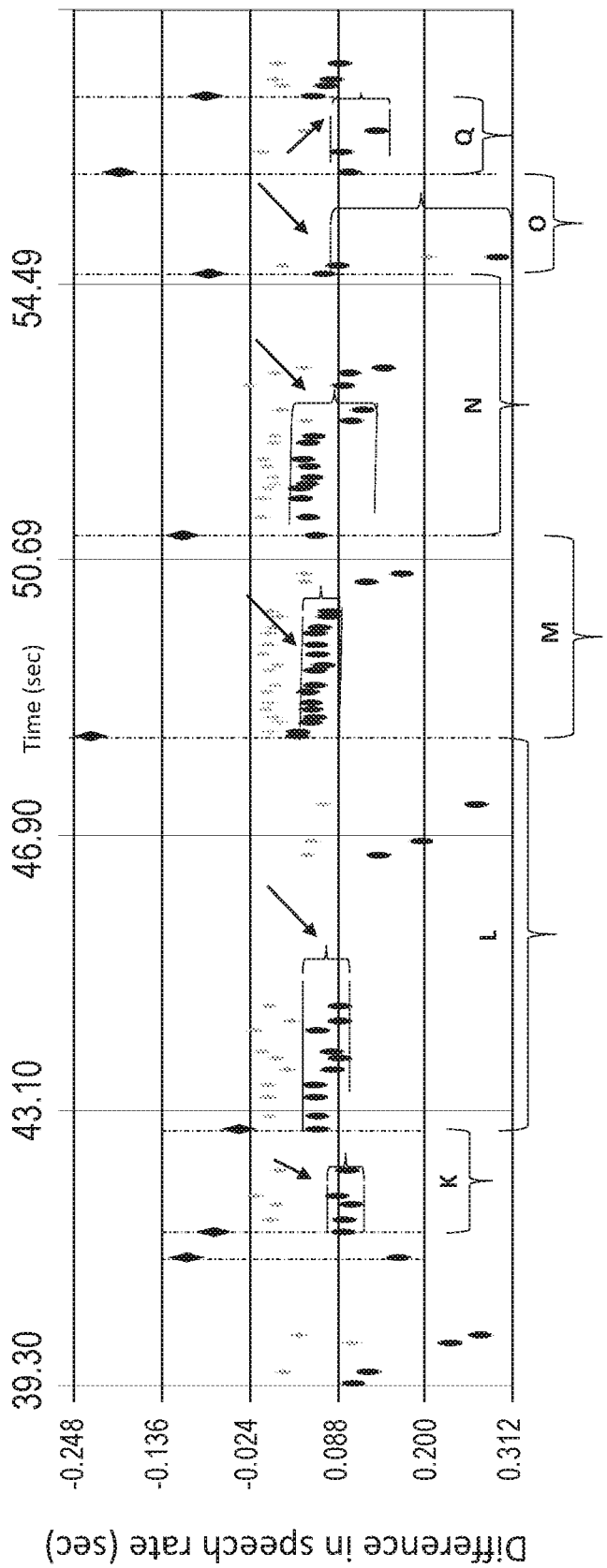
FIG. 5 is a plot of speech rate as a function of time for identifying departure from discourse flow, according to an embodiment.

FIG. 5 is plot of speech rate as a function of time across multiple segments. in which each oval dot represents the beginning of a word and the vertical height represents the average speech rate of phonemes contained in that word whereas horizontal spacing between the oval dots indicates the word speed at which individual words are articulated, according to an embodiment.

As shown in segment M, the words of noted word cluster have a substantially constant speech rate relative to the variable speech rates of the noted word clusters of remaining segment K, L N, O, and Q. Additionally, these words are articulated at a word speed greater than the analogous word clusters of remaining segment K, L N, O, and Q. This word configuration is indicative of a parenthetic statement embodying a change in discourse flow both in terms of speech rate and word speed.

Figure 6:
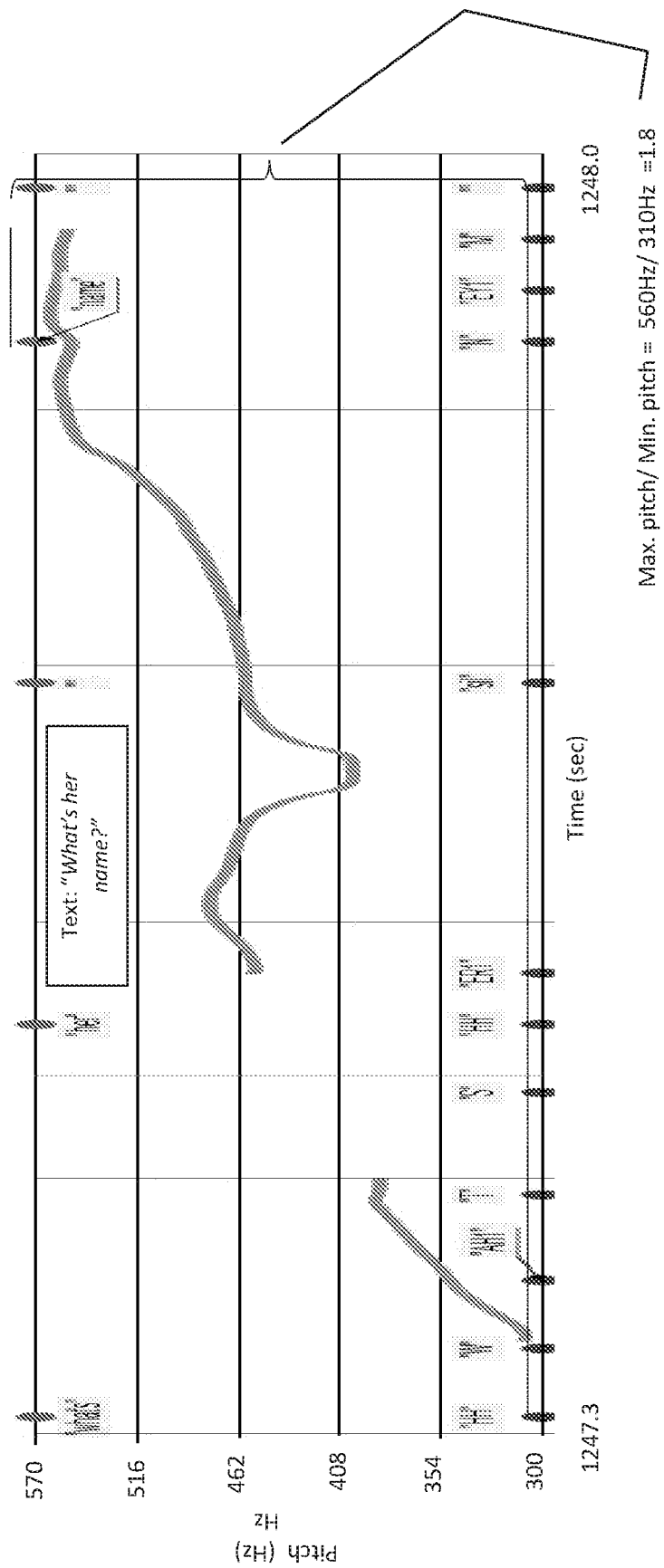
FIG. 6 is a plot of speaker pitch as a function of time for identifying ascertainment question, according to an embodiment.

FIG. 6 is a sample plot of pitch frequency as a function of time depicting a characteristic pitch change of a speaker seeking confirmation by an ascertainment question "What's her name??" The ascertainment question is identified through rate of pitch change as depicted and the degree of pitch increase during discourse flow and is formalized in this example as a maximum to minimum pitch ratio in the last third of the segment, according to an embodiment. As shown, the question begins with a minimum pitch at phoneme "W" of about 310 Hz, and increases to a maximum pitch of about 560 Hz at phoneme at "M" or a maximum to minimum pitch ratio of 1.9. A pitch ratio characteristic of ascertainment ranges between 1.7-2.1 in certain embodiments. It will be appreciated that the break in the pitch curve indicate unvoiced phonemes such as S, HH, ER1 shown along the horizontal axis.

Figure 7:
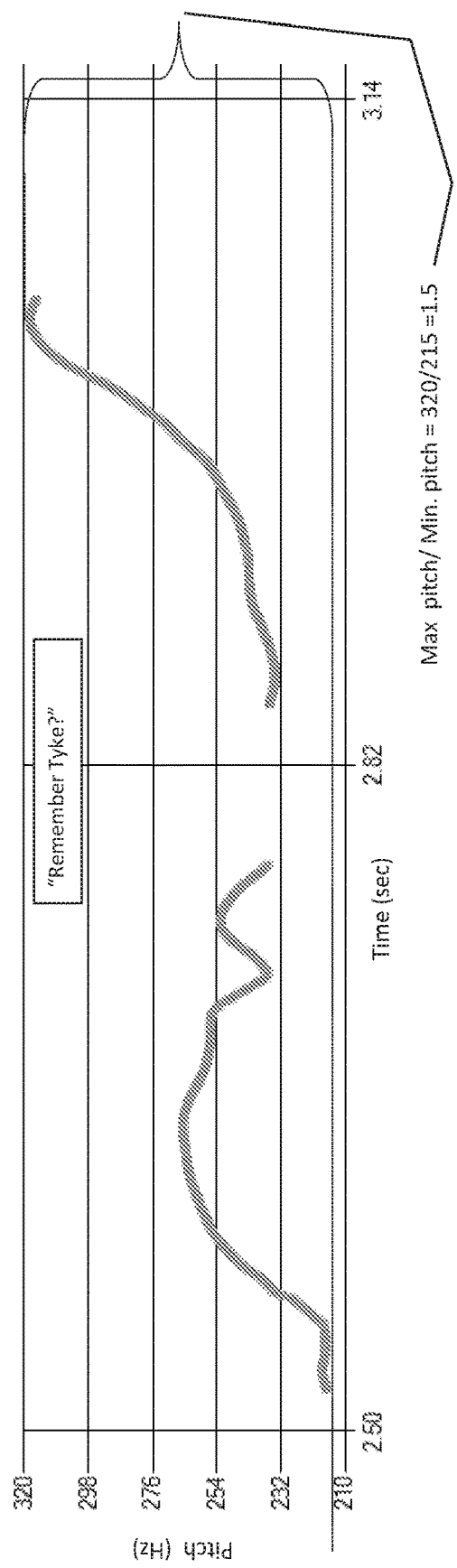
FIG. 7 is a plot of speaker pitch as a function of time for identifying a polar question, according to an embodiment.

FIG. 7 is a sample plot of pitch frequency as a function of time, depicting a characteristic pitch change of a speaker asking a polar question such as "Remember Tyke?". The polar question is also identified through the rate of change of pitch, as depicted, together with the degree of pitch increase, and is formalized in this example as maximum to minimum pitch ratio, according to an embodiment. As shown, the question begins with a minimum pitch of about 215 Hz and increases to a maximum pitch of about 320 Hz or a maximum to minimum pitch ratio of 1.43 in the last third of the segment. A pitch ratio characteristic of polar questions ranges between 1.3-1.7, in a certain embodiment.

Figure 8:
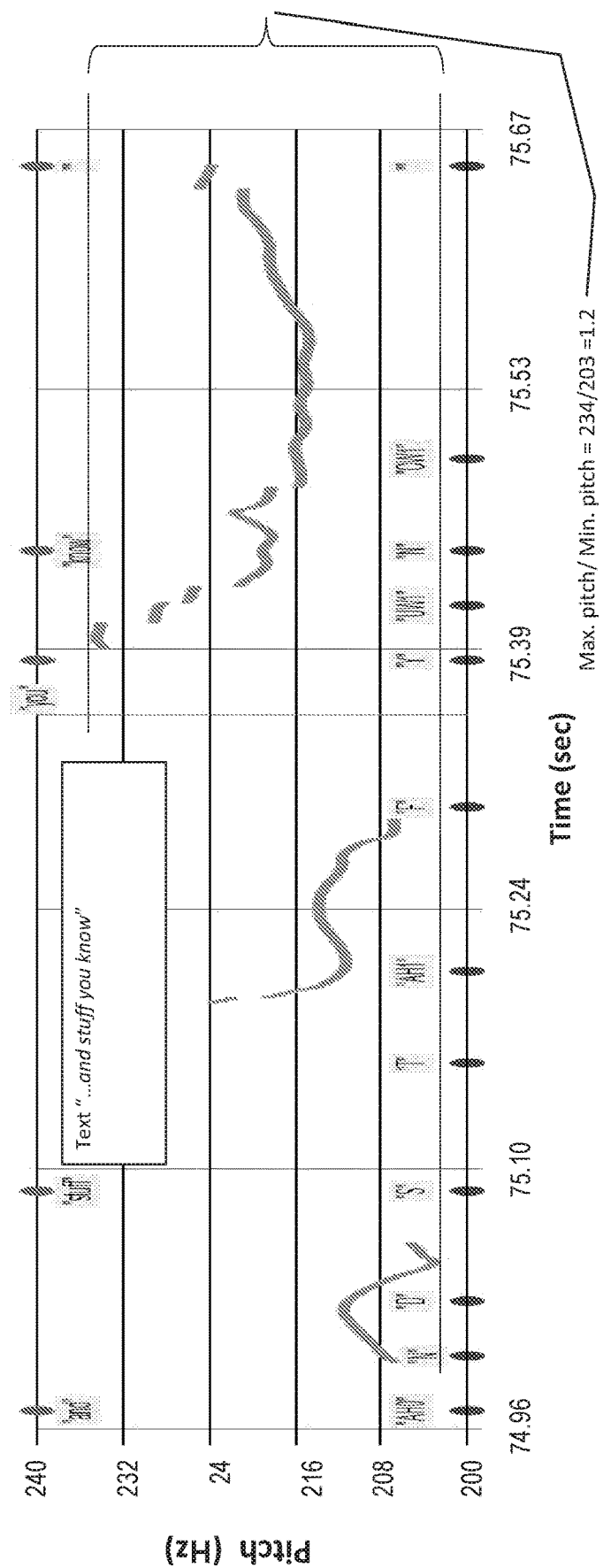
FIG. 8 is a plot of speaker pitch as a function of time for identifying up-speak, according to an embodiment.

FIG. 8 is a sample plot of pitch frequency as a function of time depicting speaker up-talk or up-speak conveying linguistic and socio-linguistic information such as speaker attitude, sentiment, or response expectation. Up-speak is characterized by a pitch increase at the end of a non-inquisitive statement such as " . . . and stuff you know." Up-speak is identified through the rate of change of pitch, as depicted within the last third of the segment and may be formalized as a ratio of maximum to minimum pitch, according to an embodiment. As shown, maximum pitch is about 234 and the minimum pitch is about 203 Hz producing a maximum to minimum pitch ratio of 1.15. A pitch ratio characteristic of up-talk inquiries ranges between 1.1-1.5 in certain embodiments.

FIGS. 9A-9B are sample plots of pitch and speech rate as a function of time, respectively. Collectively these plots depict an emphasis or a signaling of heightened informativity, according to an embodiment.

As shown, pitch plot depicts a pitch peak Q, exhibiting both a sharp increase and decrease aligned with a corresponding reduced word speed S depicted in the speech rate plot. The word speed S is evident when examining the spacing between the previous word, R and the spacing of the next word T. As noted above, speech rate represents the average phoneme rate within a single word whereas word speed refers to the delivery speed of separate words.

Figure 9C:
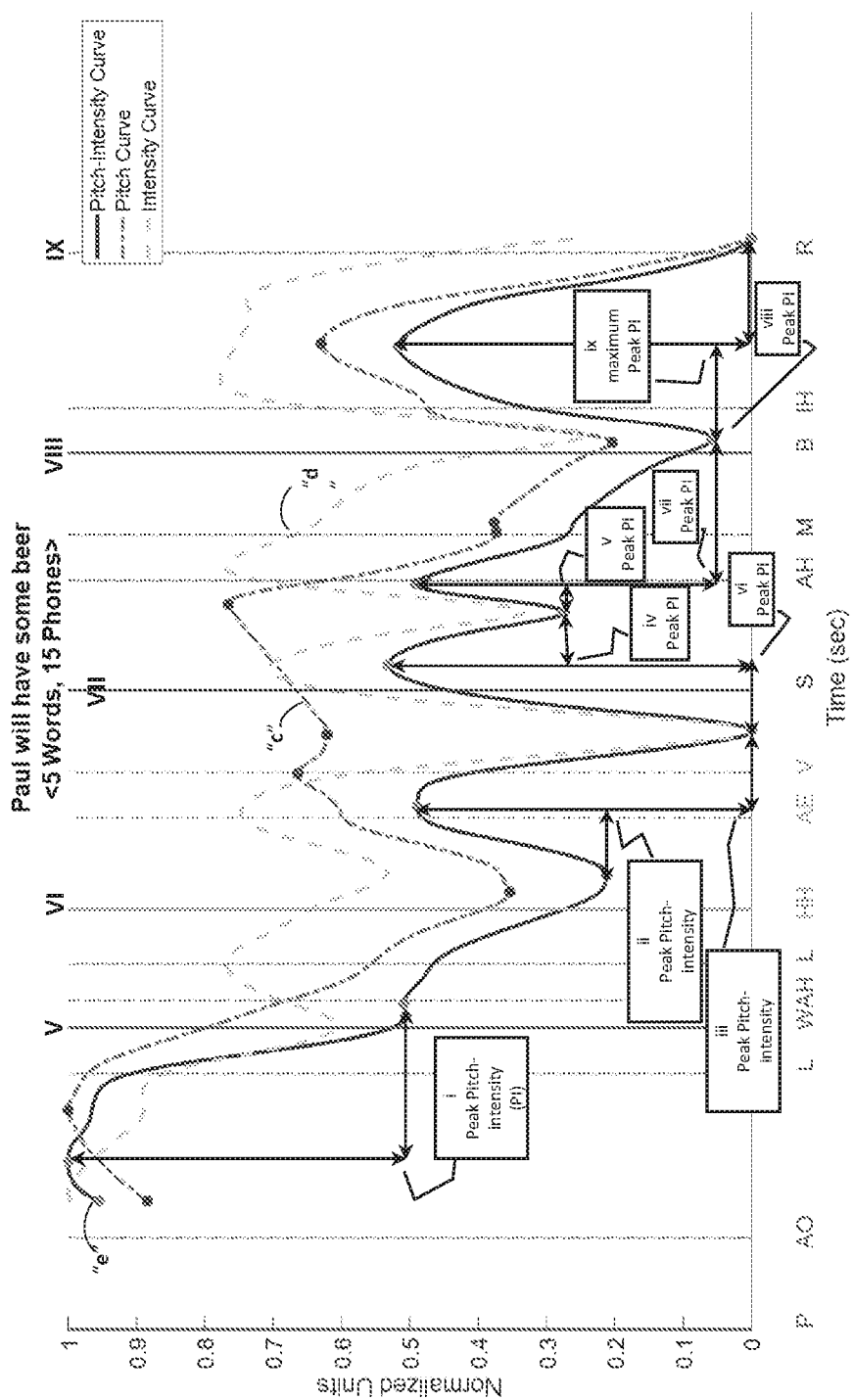
FIG. 9C depicts pitch, intensity, and intensity-pitch plots for a first test sentence lacking speaker emphasized content, according to an embodiment.
Figure 9D:
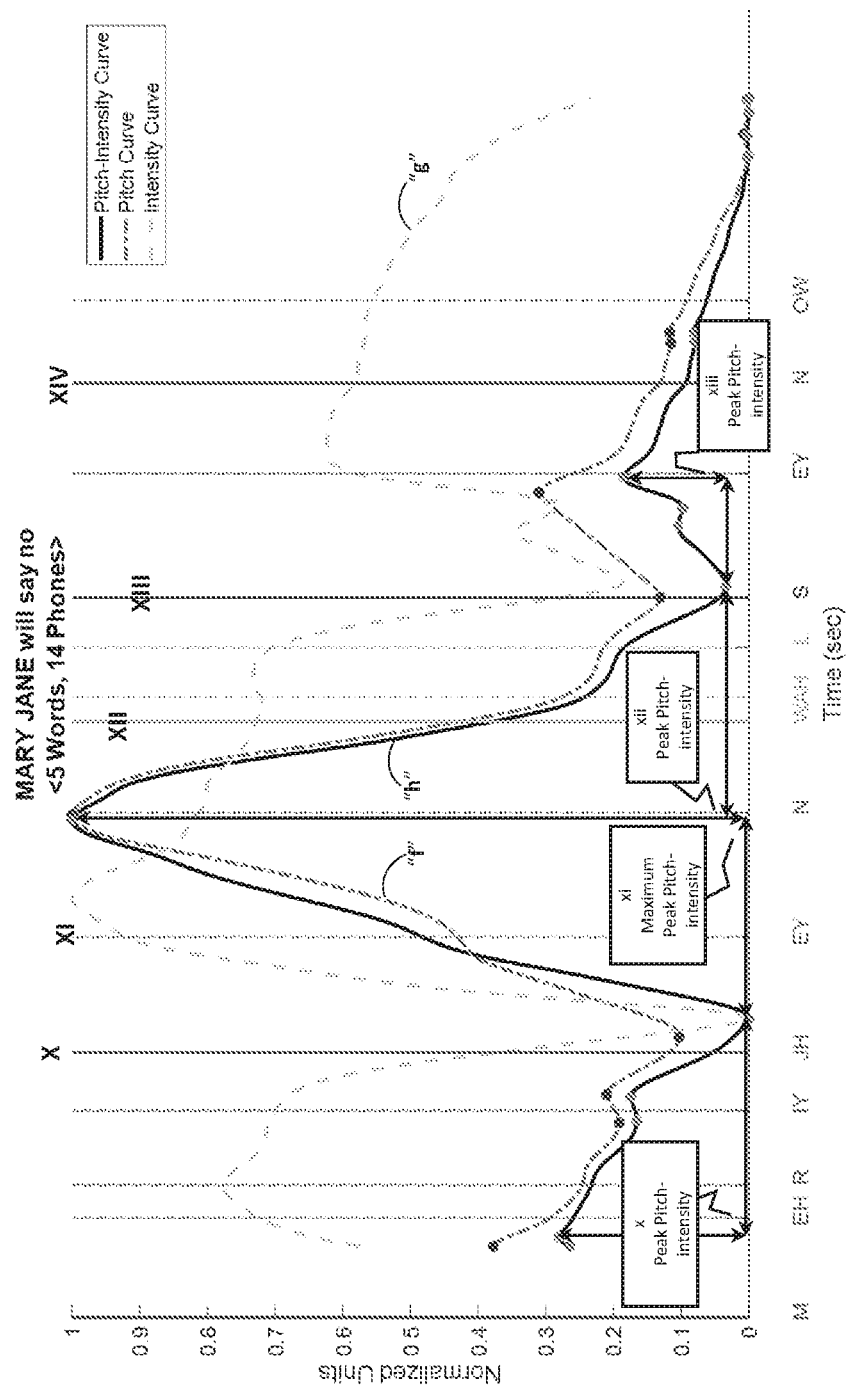
FIG. 9D depicts pitch, intensity, and intensity-pitch plots for a second test sentence having speaker emphasized content, according to an embodiment.

FIGS. 9C-9D depict an alternative method of extracting informativity from pitch by coupling it with intensity data through multiplication to generate a new prosodic parameter; Intensity-Pitch (IP) product. A peak IP value can be indicative of heightened informativity, and when coupled with other parameters such as average phone duration, pitch range, and pitch mean, can further identity heightened informativity with higher confidence levels, as will be further discussed.

As shown, in FIG. 9C, pitch and intensity data extracted from a sound wave are normalized on a speaker basis and rescaled to span a scale from zero to one. Pitch and intensity data are plotted independently as a function of timed phonemes of test sentence "Paul will have some beer." Pitch modulation is depicted in plot "c", intensity modulation depicted in plot "d", and pitch-intensity product variation depicted in plot "e".

Plot segments are denoted by their downstream boundary. Phonemes of "Paul" are dispersed along the time axis until boundary V, phonemes of "will" are dispersed until boundary VI, phonemes of "have" are dispersed until boundary VII, phonemes of "some" are dispersed until boundary VIII, and phonemes of "beer" are dispersed to the end of the plots.

Plot "e", depicting pitch-intensity product, exhibits various IP peak values are characterized as the difference between adjacent maxima and minima. As shown, IP peak value "i" is identified in section V, IP peak values "ii-iii" are identified in section VII, IP peak values "iv-vii" are identified in section VIII, and IP peak value "ix" is identified in section of IX.

In a certain embodiment of the engine, these IP peak values are used in a trained classifier employing a logistical regression model in which every word is also characterized by mean phone length (across words), pitch range, and pitch mean. The IP peak values depicted in FIG. 9C were found to be non-indicative of heightened informativity in that the classifier failed to identity a regression result achieving a decision boundary.

FIG. 9D depicts pitch and intensity data of a second test sentence "Mary Jane will say no." The data is processed and plotted as noted above in the context of FIG. 9C. Pitch modulation is depicted in plot "f", intensity modulation depicted in plot "g", and pitch-intensity product variation depicted in plot "h".

Analogous to FIG. 9C, peak maxima "x-xiii" are calculated for adjacent maxima and minima for each of plot segments X-XIV. These IP peak values were also used in the logistical regression classifier with the above-noted parameters; phone length, pitch range, and pitch mean. Speaker emphasis is was identified for the test word "Jane" in plot segment XII. As depicted, "Jane" is characterized by a high IP peak value "xi".

Although classifiers employing additional parameters are more likely to identify informativity with a higher degree of confidence, IP peak values can be employed by a classifier in the absence of phone length, pitch range, and pitch mean, or in combination of any one or two of them, in accordance with the embodiment.

Figure 10:
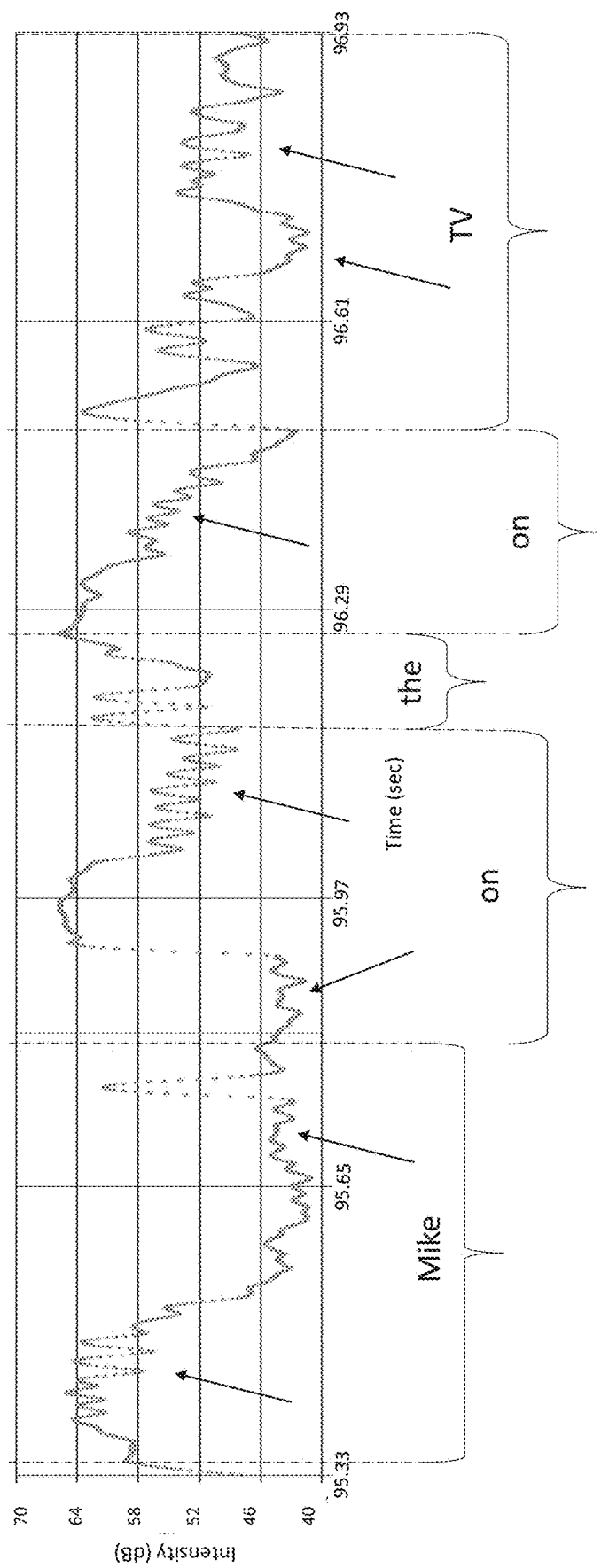
FIG. 10 is a plot of speech intensity as a function time for identifying creaky voice, according to an embodiment.

FIG. 10 is a plot of speech intensity as a function time for a sample text of "Mike on the on TV . . . " and depicts a creaky voice, according to an embodiment.

A creaky voice is characterized by a devoicing and glottalization of vowels thereby creating a low, grating voice effect.

Creaky voice prosody may convey speaker attitude, sentiment, and feelings. For example, it is fairly common among speakers of American English to utter creaky voice in order to signal a lack of confidence, a desire to distance oneself from the subject matter. Furthermore, creaky voice can also identify speaker socio-linguistic or communicational profile.

Creaky voice is a rapid succession of glottal unvoiced pulses and is recognized by a characteristic intensity fluctuation of about 48-54 Hz in a certain embodiment and 30-60 Hz in another embodiment.

As shown, the noted intensity fluctuations appear within each word of the sample statement as noted. For example, "Mike" is articulated with 25 peaks in a time span of 95.79-95.33 seconds or about 54 Hz.

Figure 11:
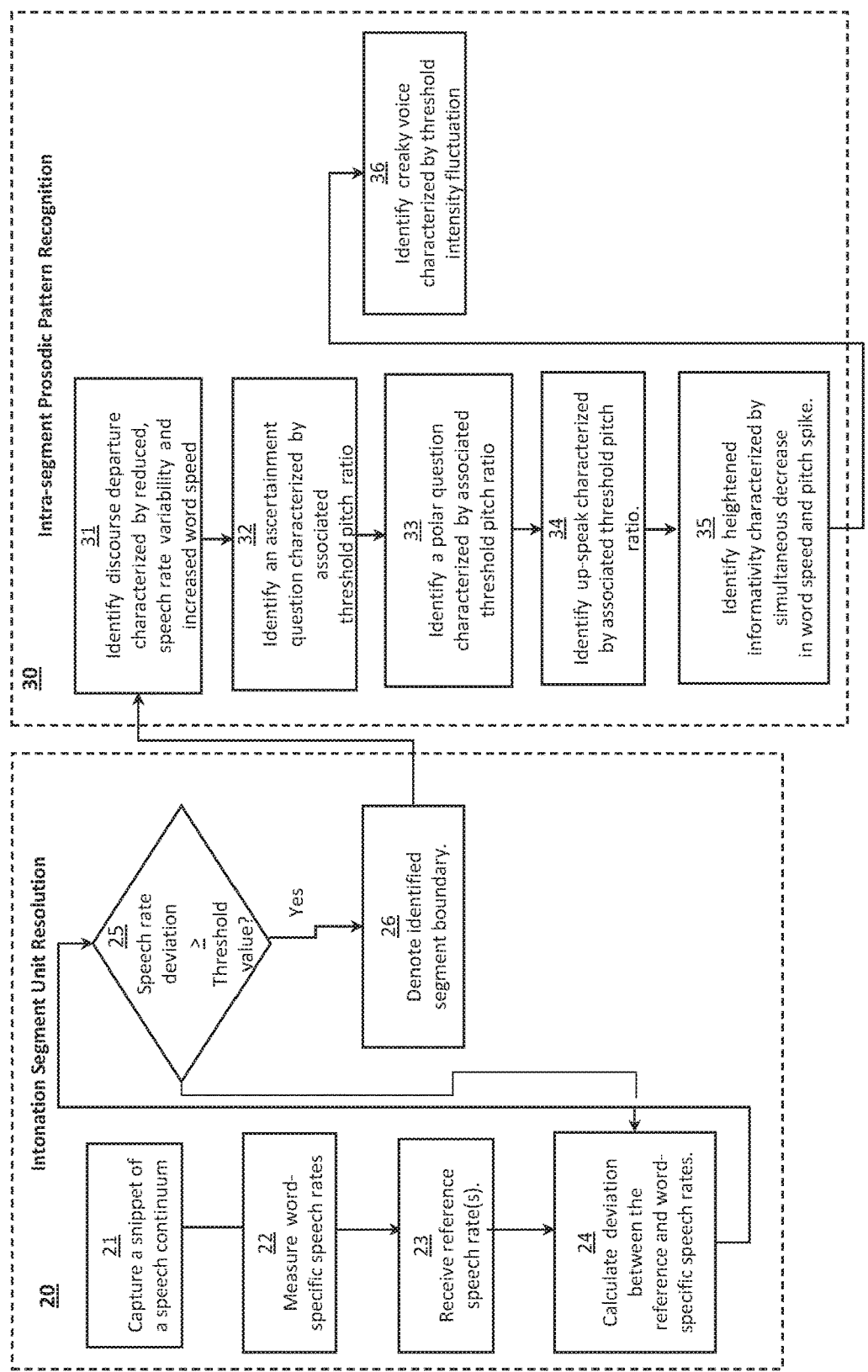
FIG. 11 is a flow diagram implementing the steps employed in the engine of FIG. 1, according to an embodiment.

FIG. 11 is a flow diagram depicting steps employed by the prosodic, speech-recognition engine of FIG. 1, according to an embodiment.

As shown, prosodic speech recognition engine 1 first performs steps associated with a segmentation stage 20 and after the intonation segments have been identified processing proceeds to steps associated with intra-segment prosodic pattern recognition in stage 30.

As shown, segmentation stage 20 includes the step of capturing a snippet speech from a speech continuum 21 and at step 22 measuring the speech rate of the captured speech continuum. Speech rate is determined on a word by word basis by calculating an average phoneme rate for each word, according to an embodiment. Phoneme rate is examined on the basis of a sliding window of 0.1-2.0 seconds or 0.3-0.5 seconds; the time window is configurable and set in accordance with needs. Without diminishing in scope, for the purposes of this document a 0.3 second time window will be discussed.

In step 23 a reference speech rate is received and is calculated in accordance with the particular embodiment. In a first embodiment, the reference speech rate is calculated as a speaker-specific, average phoneme duration across available speech data of the speaker. If a speaker profile, including an average speech rate, is already stored in a database, then a speaker specific reference speech rate retrieved from a prosodic database 15 (Shown in FIG. 1). It should be appreciated that retrieval of required thresholds and process algorithms from prosodic database 15 for any of the prosodic features is in within the scope of the present invention.

In a second variant embodiment, the reference speech rate is implemented as the average phoneme rate of the prior word.

In step 24 a deviation between speech rates and the reference speech rate or rates, depending on the embodiment set forth above, is calculated.

In step 25, a processing decision is made in accordance with the magnitude of the deviation from reference speech rate. If the deviation achieves a pre-set threshold indicative of a segment boundary, processing proceeds to step 26 where the word or time stamp of the word having the threshold deviation is denoted as segment boundary for use in later intra-boundary operations or determination of other prosodic functions, such as punctuation, disambiguation and inferring context. The boundary is output through an output device or written to database 15, or both, in accordance with embodiments. If the deviation is less than the threshold boundary, then a new speech deviation rate is calculated in step 24. In embodiments in which the reference speech rate is an average across time frames of the continuum, then the deviation is established by the difference of the baseline derived from the user profile and the speech rate of the present time frame.

After a segment has been defined, engine 1 proceeds to stage 30 in which intra-segment prosodic patterns indicative of prosodic content are identified, according to an embodiment. In a certain embodiment, only after all segments have been identified engine 1 extracts prosodic content from them as set forth below whereas in another embodiment, the newly identified segment is searched prior to identification of a new segment. In yet another embodiment, segment identification and subsequent prosodic feature scan is implemented on a segment set basis wherein each segment set includes a plurality of intonation segments.

In step 31, a word-string characterized by a departure from discourse flow, such as a parenthetic statement, is identified. Given that most words have different speech rates, their speech-rate variability provides a valuable metric for assisting in the identification in departures from disclose flow. In this example, a word-string having a departure from discourse flow is detected through reduced speech-rate variability and simultaneous increase in delivery speed. The substantially constant speech rate is calculated as an average speech rate on per segment basis and, similarly, the increase in word speed is based on the average word rate delivered on a per segment basis. In a certain embodiment, a departure from discourse flow is identified by reduced pitch variability.

In step 32, an ascertainment question is identified through detection of an intra-segment, gender-specific pitch ratio increase having a threshold maximum to minimum pitch ratio 1.7-2.1 for a female speaker in a certain embodiment. See additional embodiments set forth in the context of FIG. 7.

In step 33, a polar question is identified through detection of an intra-segment, gender-specific pitch ratio increase having a threshold maximum to minimum pitch ratio 1.1-1.3 for a female speaker in a certain embodiment. See additional embodiments set forth in the context of FIG. 8.

In step 34, up-speak is identified through detection of an intra-segment, gender-specific pitch ratio increase having a threshold maximum to minimum pitch ratio 1.1-1.7 for a male speaker in a certain embodiment. See additional embodiments set forth in the context of FIG. 9.

In step 35, an expression of heightened informativity having special importance is identified through the detection of a simultaneous decrease in word speed delivery and pitch peak. The decrease in word speed delivery is determined in the manner set forth above. The pitch peak embodying a sharp increase and decrease in frequency is identified within a time period bound by the period of reduced word speed.

This and above noted prosodic content identified is denoted through output, either to various possible output devices, or written to a database, or both.

In step 36, an expression of speaker reservation embodied as a creaky voice is identified through detection of a threshold intensity fluctuation ranging between 48-54 Hz. See an additional embodiment in the context of FIG. 11.

It should be appreciated that the steps of stages 30 do not have to be processed in the depicted manner.

The identification of prosodic patterns to extract linguistic content has a wide variety of applications including:

Increasing accuracy of interpretation of the semantic content of speech by solving ambiguities of meaning.

Inferring context from or for lexico-syntactic content of speech.

Analyzing or identifying morpho-syntactic, macro-syntactic and other semantic patterns.

Using prosodic information to generally characterize the speaker in terms of, inter alia, gender, age, cultural and socio-economical background, and general temperament.

Characterizing the speaker within the specific context of the speech act such as, inter alia, the current emotional state, disposition towards other speakers, disposition towards the topic of conversation, and towards truthfulness of uttered statements.

Recognizing syntactic patterns as governed by prosody but recognizable in their own right given the fact together they fuse and codify a single linguistic message.

Defining discursive and syntactic slots through prosodic patterns.

Figure 12:
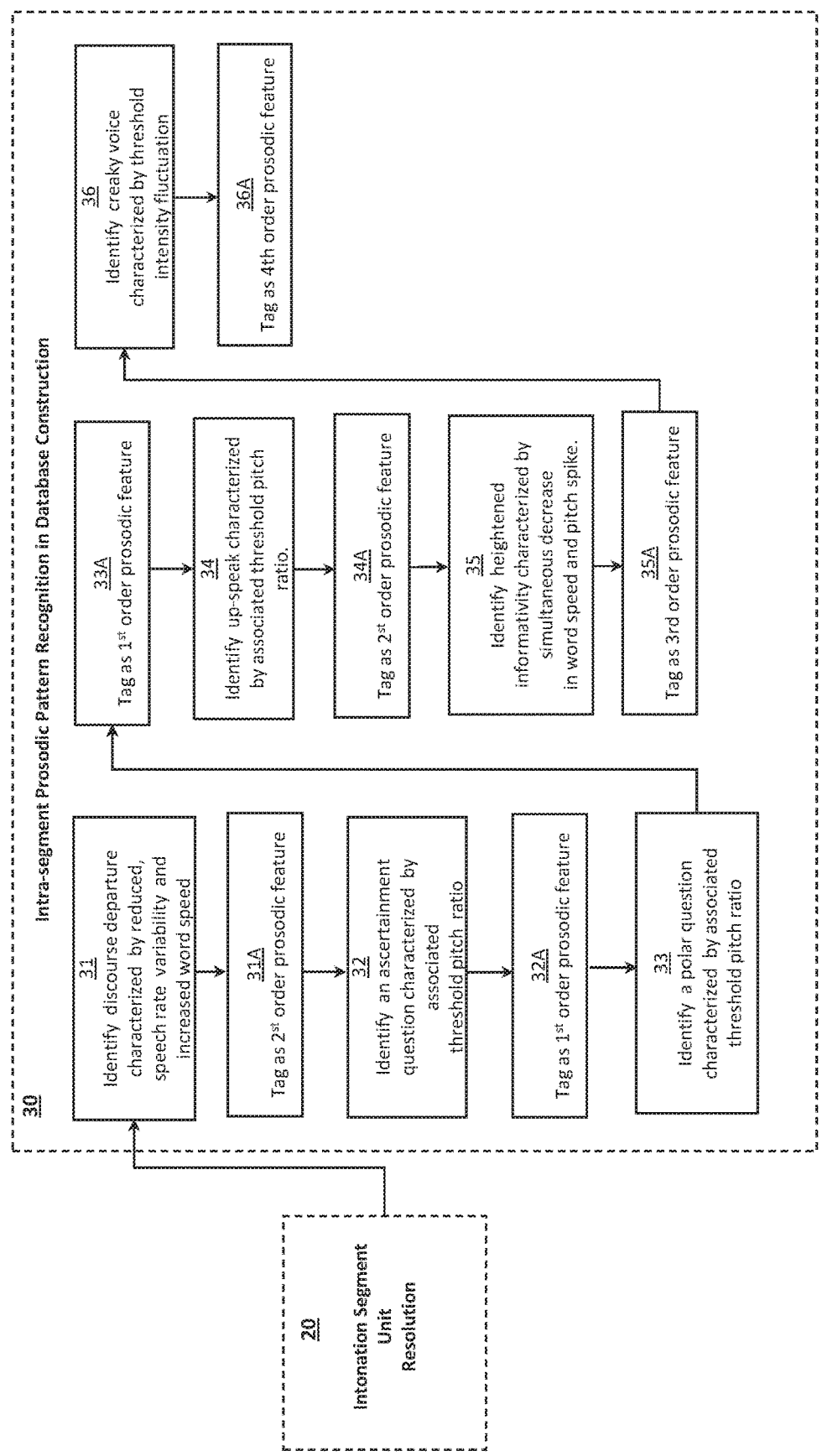
FIG. 12 is a flow diagram depicting steps in the construction of a prosodic database with tagged prosodic features to facilitate efficient classification of prosodic content of a raw sound wave, according to an embodiment.

FIG. 12 is a flow diagram depicting a second embodiment of the engine of FIG. 1 in which the engine is configured to assign tags signifying classification priority to each prosodic feature in accordance with a predefined classification order.

Specifically, the prosodic features are divided into four orders; each order signifying a priority level to be used in future classification activities of an unknown voice snippet.

A first order is assigned to "para-syntactic" prosodic features or parts of para-syntactic prototypes, a second order is assigned to prosodic features signaling the above noted discourse structure and functions, a third order is assigned to prosodic features signaling information structure, and a fourth order is assigned to prosodic features signaling speaker state and attitude. The forms of prosodic content associated with para-syntax, discourse structure, information structure, and speaker state are set forth above.

The flow diagram of FIG. 12 is analogous to the that depicted in FIG. 11 with the addition of the tagging of classification priority levels.

As shown, prosodic features signaling discourse structure identified in steps 31 and 34, are tagged as $2^{nd}$ order prosodic features in steps 31A and 34A, para-syntactic prosodic features identified in steps 32 and 33 are tagged as $1^{st}$ order prosodic features in steps 32A and 33A, a prosodic feature signaling information structure identified in step 35 is tagged as a $3^{nd}$ order prosodic feature in step 35A, and a prosodic feature signaling information structure identified in step 36 is tagged as a $3^{nd}$ order prosodic feature in step 36A. As shown, tagging is implemented in an arbitrary order; however, it should be appreciated that in a certain embodiment the order of the tagging is implemented in the order of search priority; from the highest to the lowest priority or in the reverse order. In yet another embodiment, the engine is configurable to define the order or orders of prosodic features for which tagging is implemented.

Figure 13:
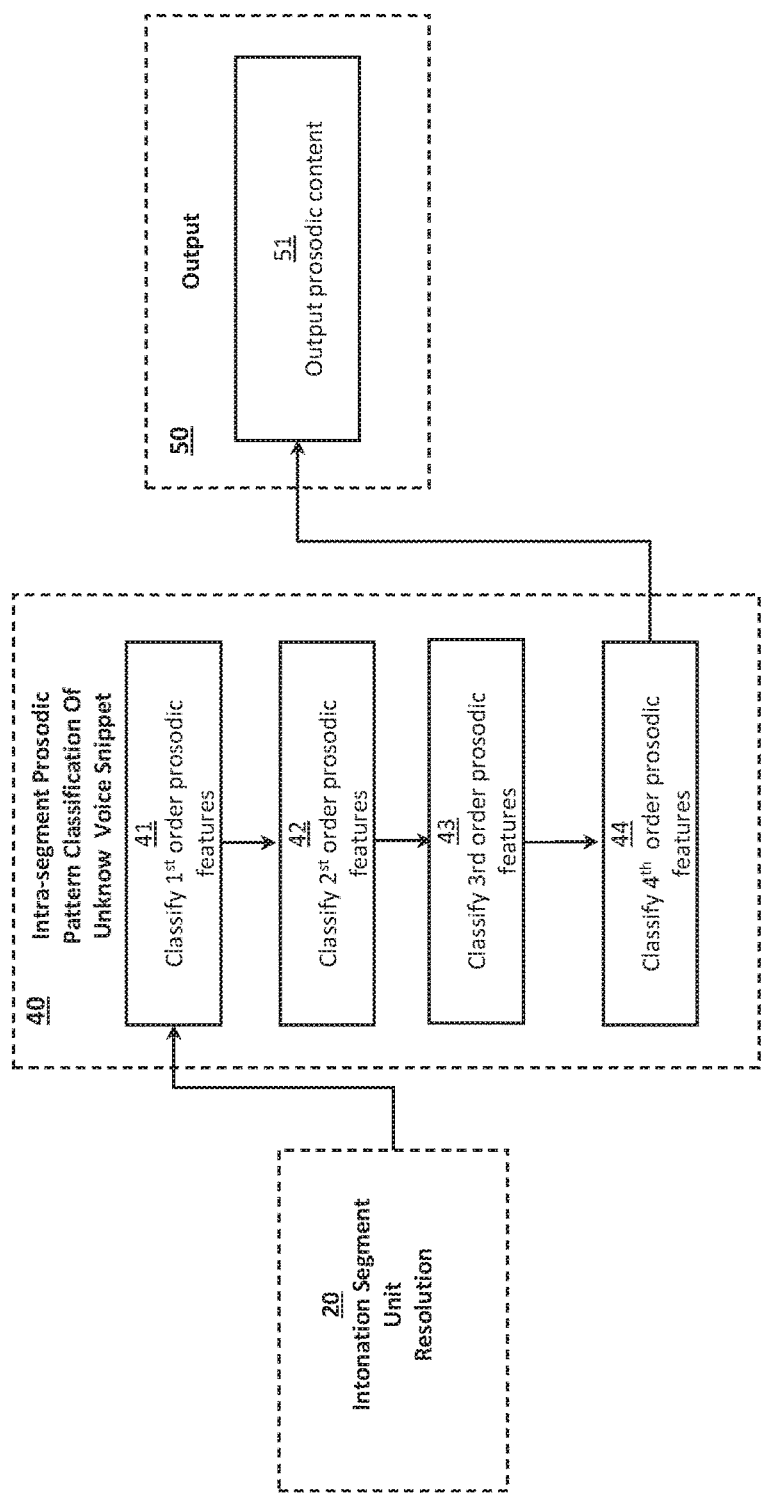
FIG. 13 is a flow diagram depicting classification stages employed in the extraction of prosodic content from an unknown raw sound wave, according to an embodiment.

FIG. 13 is a flow diagram depicting classification order employed by the engine of FIG. 1 during identification of prosodic features or patterns of an unknown voice snippet in accordance with known prosodic feature definitions of a prosodic database.

As shown, after segment resolution has been achieved in stage 20, processing continues to stage 40 where the voice snippet is searched for prosodic features that are in accordance with the prosodic pattern definitions and classification priority noted above.

Specifically, in step 41, the voice snippet is searched for $1^{st}$ order prosodic features associated with para-syntactic prototypes. For example, the engine searches for a threshold pitch ratio associated with question prototypes such as ascertainment questions or polar questions. When identified, the engine outputs the prosodic content associated with such features at step 51 of the output stage 50 in accordance with pre-defined output modes.

After $1^{st}$ order classification, a second order classification associated with prosodic features signaling discourse functions is executed by searching the snippet for $2^{nd}$ order prosodic features. One example includes, inter alia, a reduced speech rate variability accompanied with increased word speed. The associated prosodic content of a parenthetic statement is then output as noted above. Other forms of signaled discourse function expressing speaker intentions include, opening and closing statements of an argument, requests, setting forth narrative sequences, or lists. These and other classification outputs, in a certain embodiment, are implemented in real-time or at a designated time in accordance with a predefined engine configuration. It should also be appreciated that output to another data base is also deemed to be an output in a certain embodiment.

Analogously, processing continues at step 43 where the snippet is searched again; however, in this search, the engine searches for $3^{rd}$ order prosodic features associated with information structure, such as identification of simultaneous decrease in word speed and pitch peak. The associated heightened informativity is then output as noted above. Other forms of informativity expression include contrastive focus, broad focus, and information signaled as given.

Similarly, processing continues at step 44 where the snippet is searched again; however, in this search, the engine searches for $4^{th}$ order prosodic features associated with speaker sentiment, such as threshold intensity fluctuation. When found, the associated prosodic content of speaker hesitancy is output as noted above. Other $4^{th}$ order prosodic features include timbre fluctuations in formants and a speech envelope associated with speaker sentiment, irony, and impersonation.

In a certain embodiment, identification of prosodic features is facilitated by genre type defining the type of speech act from which the voice snippet is extracted. This can be used advantageously to define the classification order or to direct the classification to particular types of prosodic features and to exclude others for enhanced efficiency.

It should be appreciated that combinations of features that are not set forth explicitly but are set forth in the context of various embodiments are also within the scope of the present invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for extracting prosodic content from a speech continuum, performed on a computing device having a processor, memory, one or more code sets comprising instructions for performing the method, the code sets being stored in the memory and executed in the processor, a microphone, and output device, the method comprising:
   capturing, via the microphone, a snippet of a speech continuum of a speaker, the snippet comprising a plurality of words, each word comprising one or more phonemes;
   identifying the words within the snippet;
   for each of the words:
      measuring the duration of each phoneme within the word;
      calculating a word-specific speech rate being an average phoneme rate of phonemes within the word;
      receiving a reference speech rate based on the number of phonemes in, and duration of, at least one of the other words in the snippet; and
      calculating a speech rate deviation between the word-specific speech rate and the reference speech rate;
   identifying at least two words characterized by a threshold speech rate deviation;
   denoting, through the output device, each of the at least two words characterized by the threshold speech rate deviation as a boundary of an intonation segment;
   identifying and determining the frequency of a minimum pitch of intra-segment word-strings;
   identifying and determining the frequency of a maximum pitch of the intra-segment word-strings;
   calculating a pitch ratio of the maximum pitch to the minimum pitch;
   comparing the pitch ratio to a gender-specific threshold ratio associated with an inquiry;
   determining an intensity/pitch-product (IP-product) function of the snippet;
   classifying one or more peak IP-product values using a logistic regression model, wherein the logistic regression model is trained to identify a peak IP-product value as being indicative of heightened informativity based on a correlation between the peak IP-product value and one or more prosodic parameters other than the IP-product; and
   denoting, through the output device, a word-string comprising one or more words characterized by a pitch ratio exceeding the threshold ratio, and comprising a peak IP-product value classified as being indicative of heightened informativity, as an inquiry.

2. The method of claim 1, wherein receiving the reference speech rate comprises determining an average speech rate across the snippet.

3. The method of claim 1, wherein receiving the reference speech rate comprises determining a speech rate of a previous word in the snippet.

4. The method of claim 1, wherein the prosodic parameter comprises at least one parameter selected from the group consisting of phoneme length, pitch range, and pitch mean.

5. The method of claim 1, wherein the IP-product function is normalized.

6. A prosodic speech recognition engine comprising a microphone, memory, and one or more code sets stored in the memory, an output device, and a processor configured to execute the code sets to:
   capture, via the microphone, a snippet of a speech continuum through the microphone, the snippet comprising a plurality of words, each word comprising one or more phonemes;
   identify the words within the snippet;
   for each of the words:
      measuring the duration of each phoneme within the word;
      calculate a word-specific speech rate being an average phoneme rate of phonemes within the word;
      receive a reference speech rate based on the number of phonemes in, and duration of, at least one of the other words in the snippet; and
      calculate a speech rate deviation between the word-specific speech rate and the reference speech rate;
   identify at least two words characterized by a threshold speech rate deviation;
   denote, through the output device, each of the at least two words characterized by the threshold speech rate deviation as a boundary of at least two intonation segments;
   identify and determine the frequency of a minimum pitch of intra-segment word-strings;

identify and determine the frequency of a maximum pitch of the intra-segment word-strings;

calculate a pitch ratio of the maximum pitch to the minimum pitch;

compare the pitch ratio to a gender-specific threshold ratio associated with an inquiry;

determine an intensity/pitch-product (IP-product) function of the snippet;

classify one or more peak IP-product values using a logistic regression model, wherein the logistic regression model is trained to identify a peak IP-product value as being indicative of heightened informativity based on a correlation between the peak IP-product value and one or more prosodic parameters other than the IP-product; and denote, through the output device, a word-string comprising one or more words characterized by a pitch ratio exceeding the threshold ratio, and comprising a peak IP-product value classified as being indicative of heightened informativity, as an inquiry.

7. The engine of claim 6, wherein the reference speech rate is an average speech rate across the snippet.

8. The engine of claim 6, wherein the reference speech rate is a speech rate of a previous word in the snippet.

9. The engine of claim 6, wherein the threshold ratio is between 1.7-2.1, wherein the inquiry is an ascertainment question.

10. The engine of claim 9, wherein the processor is further configured to tag the word string having a pitch ratio having a threshold ratio of 1.7-2.1 as a first order prosodic feature.

11. The engine of claim 6, wherein the threshold ratio is between 1.3-1.7, wherein the inquiry is a polar question.

12. The engine of claim 6, wherein the threshold ratio is between 1.1-1.5, wherein the inquiry is up-speak.

13. The engine of claim 12, wherein the processor is further configured to tag the word string having a pitch ratio having a threshold ratio of 1.1-1.5 as a second order prosodic feature.

14. The engine of claim 6, wherein the processor is further configured to:

identify an intra-segment word-string having an intensity fluctuation between 48-54 Hz; and denote the word-string having an intensity fluctuation between 48 Hz to 54 Hz as an expression of speaker reservation.

15. The engine of claim 14, wherein the processor is further configured to tag the intra-segment word-string having an intensity fluctuation between 48-54 Hz as a fourth order prosodic feature.

16. The engine of claim 6, wherein the processor is further configured to employ peak intensity-pitch values so as to identify heightened informativity.

17. The engine of claim 6, wherein the prosodic parameter comprises at least one parameter selected from the group consisting of phoneme length, pitch range, and pitch mean.

18. The engine of claim 6, wherein the IP-product function is normalized.

19. The engine of claim 6, wherein the processor is further configured to:

calculate average word-delivery-speeds for intra-segment word-strings of the intonation segments;

identify an intra-segment word-string having pitch peak;

identify a word-string characterized by both a minimum, average word-delivery-speed and a pitch peak, the word-string characterized by both a minimum, average word-delivery-speed embodying heightened informativity; and denote the word-string characterized by both a minimum, average word-delivery-speed as an expression of heightened informativity.

20. The engine of claim 19, wherein the processor is further configured to tag the word-string characterized by both a minimum, average word-delivery-speed and a pitch peak as a third order prosodic feature.

* * * * *